(12) United States Patent
Ishii et al.

(10) Patent No.: US 6,934,000 B1
(45) Date of Patent: Aug. 23, 2005

(54) LIQUID CRYSTAL DISPLAY

(75) Inventors: Masahiro Ishii, Mobara (JP); Tetsuya Kawamura, Mobara (JP); Hiroshi Yamate, Mobara (JP); Masaru Takabatake, Mobara (JP)

(73) Assignee: Hitachi, Ltd., Tokyo (JP)

( * ) Notice: Subject to any disclaimer, the term of this patent is extended or adjusted under 35 U.S.C. 154(b) by 92 days.

(21) Appl. No.: 10/362,567

(22) PCT Filed: Sep. 20, 2000

(86) PCT No.: PCT/JP00/06447

§ 371 (c)(1),
(2), (4) Date: Jul. 14, 2003

(87) PCT Pub. No.: WO02/25365

PCT Pub. Date: Mar. 28, 2002

(51) Int. Cl.$^7$ ............................................. G02F 1/1345
(52) U.S. Cl. ...................... 349/149; 349/147
(58) Field of Search ................................ 349/147–152

(56) References Cited

U.S. PATENT DOCUMENTS 6,275,278 B1 * 8/2001 Ono et al. .................. 349/152

OTHER PUBLICATIONS

Japanese Search Report dated Oct. 17, 2000 for PCT/JP00/06447.

* cited by examiner

*Primary Examiner*—Tarifur R. Chowdhury
*Assistant Examiner*—Richard H Kim
(74) *Attorney, Agent, or Firm*—Reed Smith LLP; Stanley P. Fisher, Esq.; Juan Carlos A. Marquez, Esq.

(57) ABSTRACT

At terminal portions, the occurrence of electrolytic corrosion can be suppressed and, at the same time, the connection resistance between the terminal portions and other electrodes to be connected is largely reduced. On a liquid-crystal-side surface of one substrate out of a pair of substrates which are arranged to face each other by way of liquid crystal, signal lines, an insulation film covering the signal lines, terminal portions having one portions of the signal lines exposed by forming holes in the insulation film, and conductive oxide films laminated to the terminal portions are formed. The conductive oxide films are laminated to peripheries of the terminal portions except for the centers of the terminal portions.

25 Claims, 18 Drawing Sheets

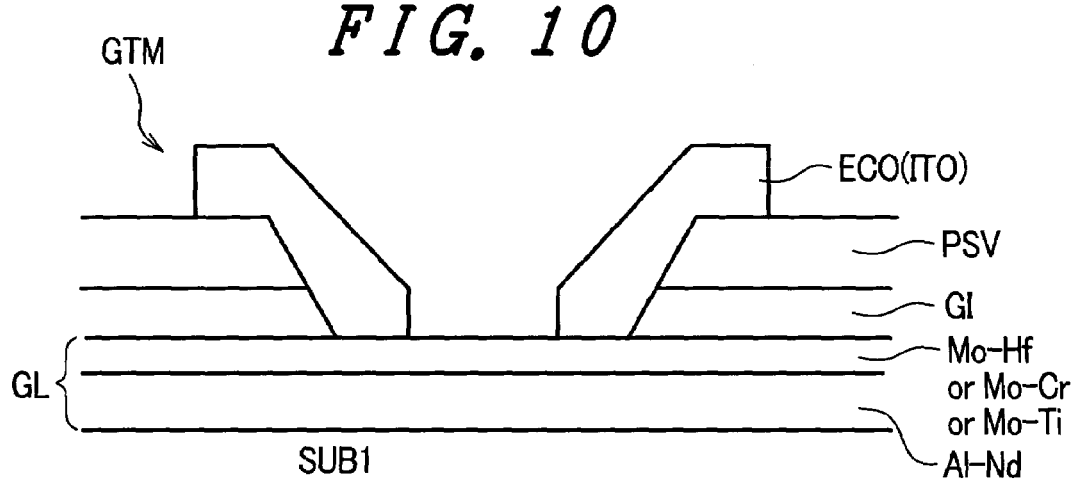
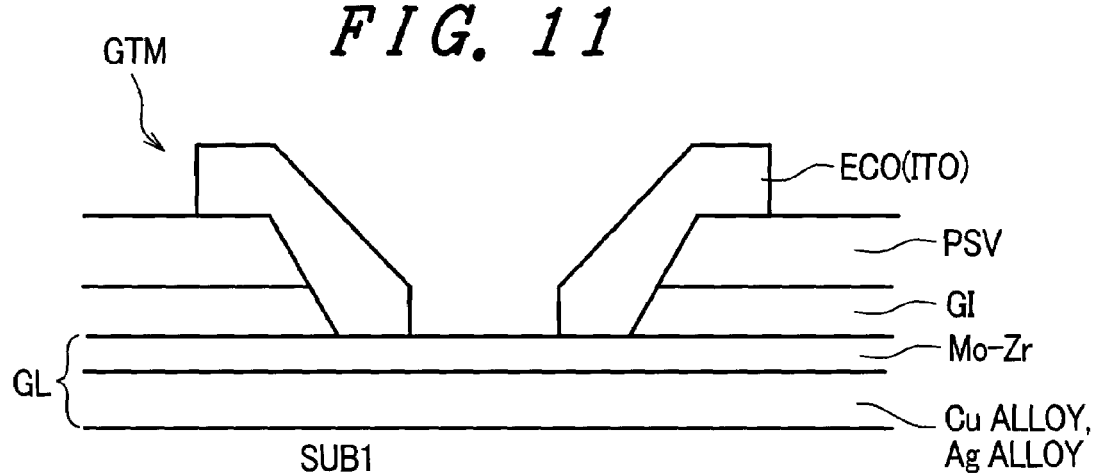
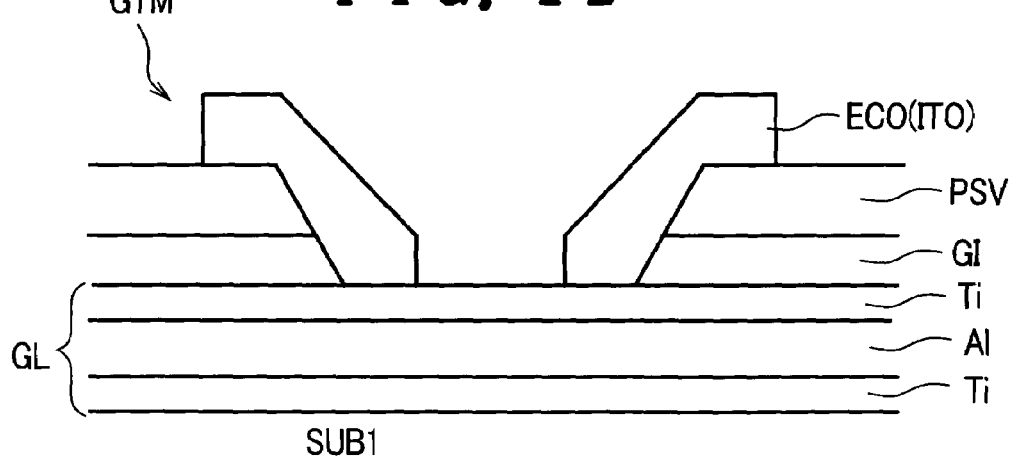

LIQUID CRYSTAL DISPLAY

FIELD OF THE INVENTION

The present invention relates to a liquid crystal display device, and more particularly to an improvement of the structure of terminal portions thereof.

BACKGROUND OF THE INVENTION

In an active matrix type liquid crystal display device, on a liquid-crystal-side surface of one transparent substrate out of respective transparent substrates which are arranged to face each other while sandwiching liquid crystal therebetween, gate signal lines which extend in the x direction and are arranged in parallel in the y direction and drain signal lines which extend in the y direction and are arranged in parallel in the x direction are formed, and respective rectangular regions which are surrounded by these respective signal lines constitute pixel regions.

Each pixel region includes a thin film transistor which is driven by the supply of scanning signals from one-side gate signal line and a pixel electrode to which video signals from one-side drain signal line are supplied through the thin film transistor.

In this manner, the driving of each pixel is performed by the supply of the scanning signals and video signals, wherein the scanning signals and the video signals are respectively supplied through terminal portions of the gate signal lines and terminal portions of the drain signal lines which are formed such that these terminal portions extend to a region outside a display part which is formed of a mass of the pixel regions.

There has been known a structure in which the gate signal lines and the drain signal lines are covered with an insulation film which also has a function of a gate insulation film for the thin film transistor or a protective film which also has a function of obviating the direct contact of the thin film transistor with the liquid crystal. Here, the respective terminal portions of the gate signal lines and the drain signal lines are exposed through holes formed in the insulation film or the protective film and, at the same time, exposed surfaces of the respective terminal portions are covered with a conductive oxide such as ITO (Indium-Tin-Oxide), for example, to prevent the occurrence of a so-called electrolytic corrosion.

In such a liquid crystal display device to realize the high transmissivity, the liquid crystal display device must satisfy both of the achievement of low resistance of the signal lines and the provision of transparent electrodes as electrodes in the inside of the pixels.

Here, to consider the achievement of low resistance of the signal lines, first of all, the use of lines containing aluminum (Al) or an alloy thereof (hereinafter, also referred to as an aluminum line), for example is considered.

On the other hand, although a voltage is applied to the signal lines by a driving circuit (semiconductor integrated circuit) mounted on the liquid crystal display device, there has been a demand that the connection resistance at a connection portion (contact portion or terminal portion) must be reduced. This is because that along with the demand for high definition of display in recent years, an area of the contact portion is largely reduced and hence, the increase of the connection resistance is no more ignored. For example, a method for mounting driving circuits to the liquid crystal display device has been shifted from a conventional TCP (Tape Carrier Package) method to a COG (Chip On Glass) method and a large decrease of the area of the contact portion is apparent in the COG method.

Simultaneously, as mentioned previously, the contact portion is covered with the conductive oxide such as ITO or the like for obviating the electrolytic corrosion, to achieve both of the reduction of connection resistance with the driving circuits and the ensuring of the reliability, polycrystalline oxide (for example, p-ITO) has been generally and specifically used as the oxide.

However, it has been confirmed that the use of the aluminum lines as the signal lines and the use of the p-ITO or the like in the terminal portions for obviating the electrolytic corrosion give rise to following drawbacks.

That is, although the use of a strong acid such as HBr, for example, is indispensable at the time of processing the p-ITO by etching, the strong acid permeates defective portions of the insulation film (insulation film having also a function of the gate insulation film for the thin film transistor) and the protective film (the insulation film for obviating the direct contact of the thin film transistor with the liquid crystal) which cover the signal lines, and eventually dissolves the aluminum lines. This induces the disconnection of the signal lines, lowers the manufacturing yield factor, and becomes a cause of the increase of cost.

To cope with such a drawback, the use of amorphous ITO (a-ITO) or IZO (Indium-Zinc-Oxide) in place of p-ITO and the use of oxalic acid (($COOH)_2$) as an etchant for processing the amorphous ITO or the like are considered. This is because that the acidity of the oxalic acid is not strong enough to dissolve the aluminum lines.

However, the selection of a-ITO or IZO largely increases the connection resistance at the time of connection with the driving circuit and hence, it is hardly possible to obtain the original target, that is the reduction of the contact resistance.

FIG. 26 is a graph showing the respective contact resistances of p-ITO, a-ITO and IZO. The strength of respective materials when a needle is pressed to the materials is taken on the axis of abscissas and the contact resistance between each material and the needle at the time of pressing is taken on the axis of ordinates.

In the liquid crystal display device, it is considered that the pressing pressure applied to a bump of the driving circuit with respect to the signal line at the terminal portion falls substantially within a range A in the graph. In this case, it is understood that from a viewpoint of reduction of the contact resistance, the use of p-ITO as the electrolytic corrosion obviating material is extremely advantageous compared to the use of a-ITO or the IZO.

The present invention has been made under such circumstances and it is an object of the present invention to provide a liquid crystal display device which can suppress the occurrence of electrolytic corrosion at terminal portions thereof and, at the same time, can largely reduce the connection resistance between the terminal portions and other electrodes which are connected with the terminal portions.

SUMMARY OF THE INVENTION

To briefly explain typical inventions among the inventions disclosed in the present application, they are as follows.

First of all, the present application adopts a structure in which an anisotropic conductive film is interposed in bumps or the like of a driving circuit at terminal portions of aluminum lines which constitute signal lines. This is because that such a structure can reduce the connection resistance compared to other connection methods.

On the other hand, when the aluminum lines are made of aluminum or an alloy thereof per se, the aluminum lines are liable to be easily oxidized by oxygen in air or water and this becomes a factor to increase the connection resistance.

To prevent such a drawback, following signal lines are used.

(1) A signal line which is formed by laminating a molybdenum layer or a molybdenum alloy layer to the aluminum layer or the aluminum alloy layer.

(2) A signal line which is constituted of a body formed by sequentially laminating a titanium layer or a titanium nitride layer, an aluminum layer, and a titanium layer or a titanium nitride layer.

(3) A signal line which is formed by laminating a molybdenum layer or a molybdenum alloy layer containing nitrogen to an aluminum layer or an aluminum alloy layer.

(4) A signal line which is formed by laminating a molybdenum layer or a molybdenum alloy layer to an aluminum layer or an aluminum alloy layer, wherein the nitriding is applied to at least a connection portion between the terminal portion and the bump or the like of the driving circuit.

Further, in view of the fact that the electrolytic corrosion at the terminal portion is a corrosion caused by an electric field generated under the presence of water or the like between the terminal portion and the neighboring terminal portion, following provisions can be adopted.

(5) A transparent conductive film is formed between the terminal portion and other terminal portion which is arranged close to the terminal portion.

(6) A transparent conductive film is formed in the periphery of the terminal portion.

(7) Without forming a transparent conductive film between the terminal portion and the other terminal portion which is arranged close to the terminal portion and has a potential equal to a potential of the terminal portion, the transparent conductive film is formed between the terminal portion and the other terminal portion which is arranged close to the terminal portion and has a potential different from a potential of the terminal portion.

These and other objects, features and advantages according to the present invention will become more apparent in conjunction with the description made hereinafter and attached drawings.

BRIEF EXPLANATION OF THE DRAWINGS

FIG. 10 is a cross-sectional view showing an essential part (terminal portion) of another embodiment of the liquid crystal display device according to the present invention.

FIG. 11 is a cross-sectional view showing an essential part (terminal portion) of another embodiment of the liquid crystal display device according to the present invention.

FIG. 12 is a cross-sectional view showing an essential part (terminal portion) of another embodiment of the liquid crystal display device according to the present invention.

BEST MODE FOR CARRYING OUT THE INVENTION

One embodiment of a liquid crystal display device according to the present invention is explained hereinafter in conjunction with drawings.

Embodiment 1

Equivalent Circuit

Figure 2:
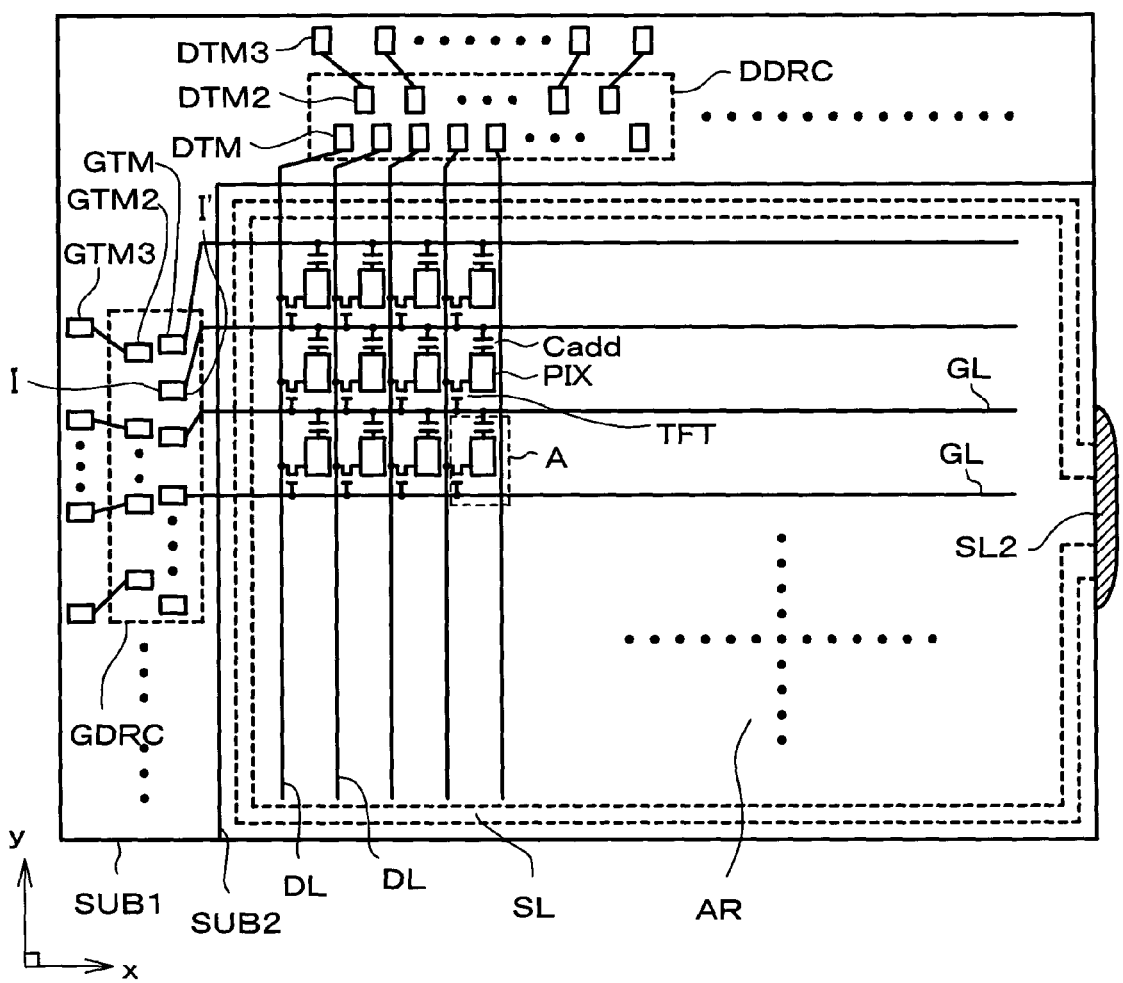
FIG. 2 is a view showing an equivalent circuit of one embodiment of the liquid crystal display device according to the present invention.

FIG. 2 is an equivalent circuit diagram showing one embodiment of a liquid crystal display device according to the present invention. Although the drawing is a circuit diagram, the drawing is depicted corresponding to an actual geometric arrangement.

In the drawing, there is described a transparent substrate SUB1 and the transparent SUB1 is arranged to face another transparent substrate SUB2 in an opposed manner by way of liquid crystal.

On a liquid-crystal-side surface of the transparent substrate SUB1, gate signal lines GL which extend in the x direction and are arranged in parallel in the y direction in the drawing and drain signal lines DL which extend in the y direction and are arranged in parallel in the x direction in the drawing while being insulated from the gate signal lines GL are formed. Rectangular regions which are surrounded by these respective signal lines constitute pixel regions and a display part AR is constituted of a mass of these respective pixel regions.

On each pixel region, a thin film transistor TFT which is driven by the supply of scanning signals (voltages) from one gate signal line GL and a pixel electrode PIX to which video signals (voltages) are supplied from one drain signal line DL through the thin film transistor TFT are formed.

Further, a capacitive element Cadd is formed between the pixel electrode PIX and another gate signal line GL which is arranged close to one gate signal line GL. This capacitive element Cadd is served for storing the video signals supplied to the pixel electrode PIX for a long time when the thin film transistor TFT is turned off.

The pixel electrode PIX in each pixel region is configured to generate an electric field between the pixel electrode PIX and a counter electrode CT (not shown in the drawing) which is formed in common in each pixel region on a liquid-crystal-side surface of another transparent substrate SUB2 which is arranged to face one transparent substrate SUB1 by way of the liquid crystal. Due to such an electric field, the optical transmissivity of the liquid crystal between respective electrodes can be controlled.

One end of each gate signal line GL is extended to one side (left side in the drawing) of the transparent substrate and an extended portion forms a terminal portion GTM which is connected to a bump of a semiconductor integrated circuit GDRC which constitutes a vertical scanning circuit mounted on the transparent substrate SUB1. Further, one end of each drain signal line DL is also extended to one side (upper side in the drawing) of the transparent substrate SUB1 and an extended portion forms a terminal portion DTM which is connected to a bump of a semiconductor integrated circuit DDRC which constitute a video signal driving circuit mounted on the transparent substrate SUB1.

Figure 25:
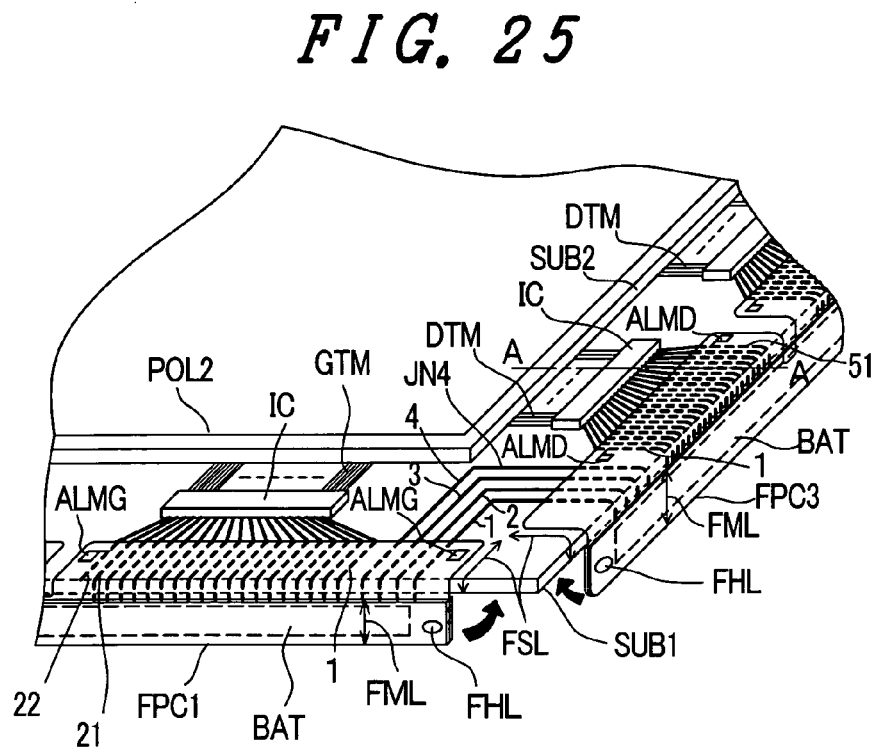
FIG. 25 is a perspective view of a COG type liquid crystal display device.
Figure 26:
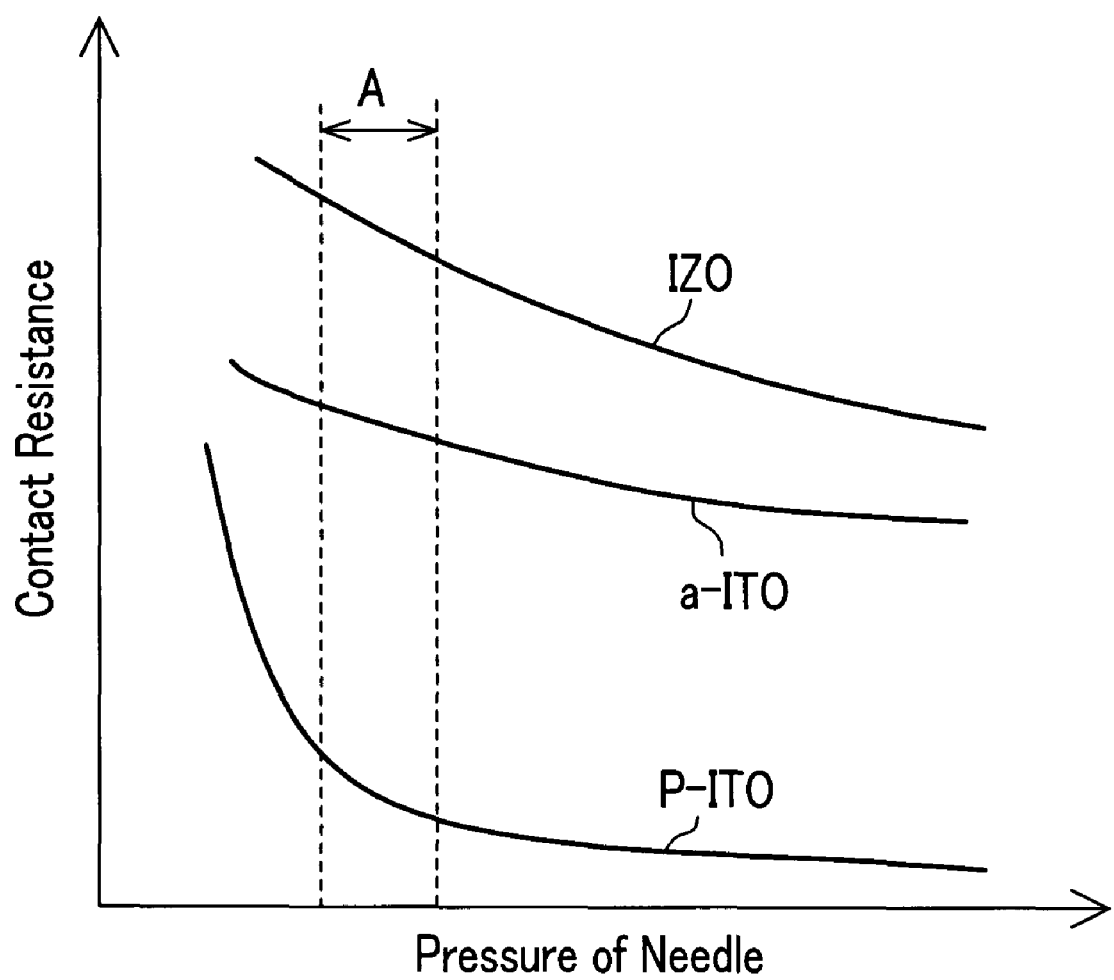
FIG. 26 is a graph showing the relationship between the contact resistance of IZO, a-ITO and p-ITO with other metal and a pressing pressure.

The semiconductor integrated circuits GDRC, DDRC have respectively whole bodies thereof completely mounted on the transparent substrate SUB1 thus adopting a so-called COG (Chip On Glass) method. A perspective view of an appearance of the liquid crystal display device adopting this COG method is shown in FIG. 25, for example.

Respective bumps at the input side of the semiconductor integrated circuits GDRC, DDRC are also respectively connected to terminal portions GTM2, DTM2 which are formed on the transparent substrate SUB1, while these respective terminal portions GTM2, DTM2 are connected to terminal portions GTM3, DTM3 which are respectively arranged at portions arranged closest to end faces in the periphery of the transparent substrate SUB1 through respective wiring layers.

The feature of such a COG method lies in that with respect to each bump at each output side of each semiconductor integrated circuit GDRC, DDRC, a distance between each bump and another bump which is arranged close to the bump is set extremely small and hence, with respect to each terminal portion GTM of the gate signal line GL and each terminal portion DTM of the drain signal line DL, a distance between each terminal portion and another terminal portion which is arranged close to the terminal portion is also set extremely small.

Accordingly, not to mention each bump at each output side of each semiconductor integrated circuit GDRC, DDRC, each terminal portion GTM of the gate signal line GL and each terminal portion DTM of the drain signal line DL exhibit an extremely small occupying area thus giving rise to a state that the increase of the connection resistance between the bump and the terminal portion GTM, DTM cannot be ignored.

The above-mentioned transparent substrate SUB2 is arranged to face the transparent substrate SUB1 in an opposed manner such that the transparent substrate SUB2 is not formed in a region where the semiconductor integrated circuits are mounted so that the transparent substrate SUB2 has an area smaller than that of the transparent substrate SUB1.

Here, the transparent substrate SUB2 is fixed to the transparent substrate SUB1 using a sealing material SL formed in the periphery of the transparent substrate SUB2, wherein the sealing material SL also has a function of sealing the liquid crystal between the transparent substrates SUB1, SUB2.

Although the above-mentioned explanation is made with respect to the liquid crystal display device adopting the COG method, the present invention is also applicable to a liquid crystal display device adopting a TCP method. Here, the TCP method is a method in which semiconductor integrated circuits are formed by a tape carrier method, wherein output terminals of the semiconductor integrated circuits are connected to terminal portions formed on the transparent substrate SUB1 and input terminals of the semiconductor integrated circuits are connected to terminal portions on a printed circuit board arranged close to the transparent substrate SUB1.

Constitution of Pixel

Figure 3:
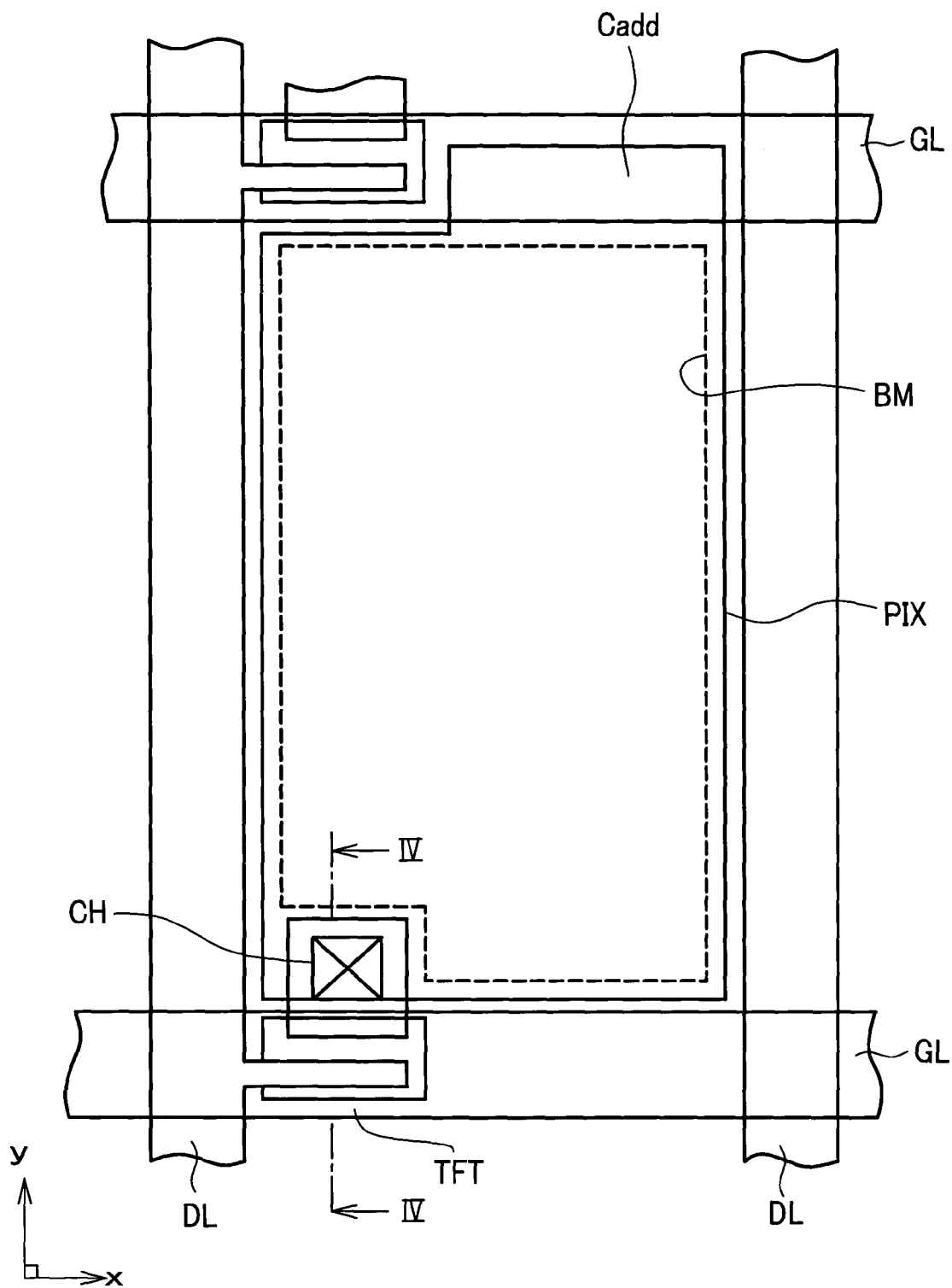
FIG. 3 is a plan view showing one embodiment of the constitution of a pixel of the liquid crystal display device according to the present invention.

FIG. 3 is a plan view showing the constitution of one pixel region of the transparent substrate SUB1 and corresponds to a portion indicated by a dotted line frame A shown in FIG. 2.

Figure 4:
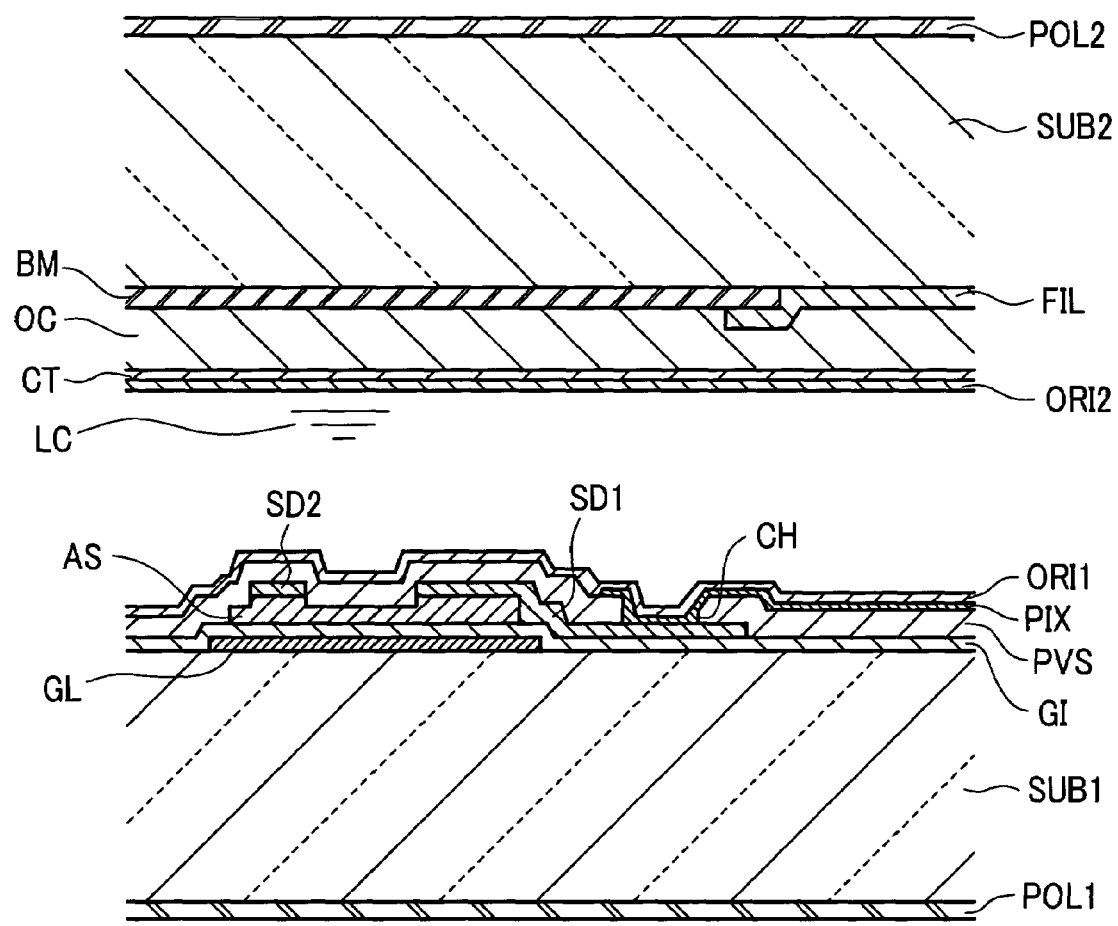
FIG. 4 is a cross-sectional view taken along a line IV—IV in FIG. 3.
Figure 5:
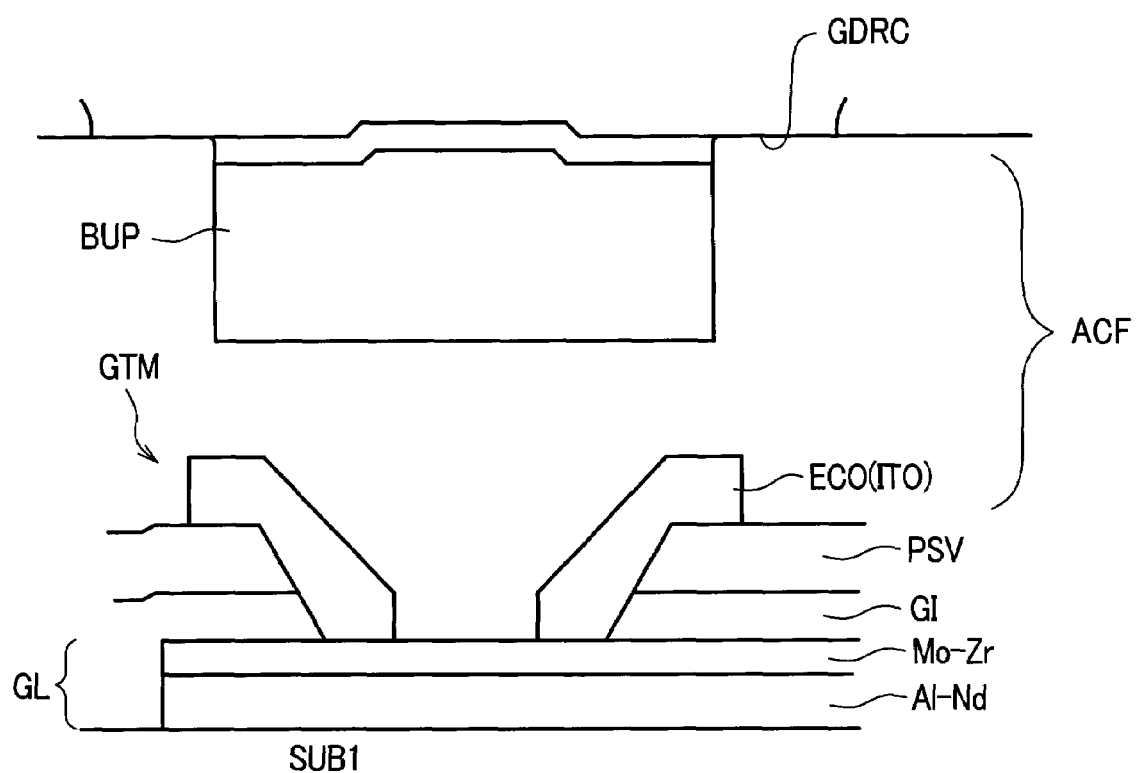
FIG. 5 is a cross-sectional view showing the constitution of a connection between the terminal portions of the liquid crystal display device according to the present invention and bumps of a semiconductor integrated circuit.

Further, FIG. 4 is a cross-sectional view taken along a line IV—IV in FIG. 3 and also shows a cross section of the transparent substrate SUB2.

In FIG. 3, first of all, the gate signal lines GL are formed on the liquid-crystal-side surface of the transparent substrate SUB1 such that the gate signal lines GL extend in the x direction and are arranged in the y direction in parallel in the drawing.

The gate signal line GL has, in this embodiment, a two-layered structure, wherein a lower layer is formed of an alloy layer made of Al and Nd (hereinafter such an alloy layer being also referred to as an Al—Nd layer) and an upper layer is formed of an alloy layer made of Mo and Zr (hereinafter such an alloy layer being also referred to as a Mo—Zr layer).

The reason that such a two-layered structure is adopted is that the structure brings about advantageous effects that can largely reduce the resistance value of the gate signal line GL and the cross section exhibits a normal tapered shape at the time of processing a selective etching. Other advantages obtained by the two-layered structure will become apparent by the explanation described later.

An insulation film GI made of, for example SiN is formed over the surface of the transparent substrate SUB1 such that the insulation film GI covers the gate signal lines GL.

The insulation film GI performs a function of an interlayer insulation film for the gate signal lines GL with respect to the drain signal lines DL which will be explained later, performs a function of a gate insulation film with respect to a thin film transistor TFT which will be explained later, and performs a function of a dielectric film with respect to a capacitive element Cadd which will be explained later.

On a portion arranged at a left bottom side of the pixel region which overlaps the gate signal line GL, an i-type (intrinsic: doped with no conductive determining impurity) semiconductor layer AS made of a-Si, for example, is formed.

By forming a source electrode and a drain electrode on an upper surface of the semiconductor layer AS, it is possible to constitute a semiconductor layer of a MIS type thin film transistor TFT which uses a portion of the gate signal line as a gate electrode.

The source electrode SD1 and the drain electrode SD2 of the thin film transistor TFT are formed simultaneously with the formation of the drain signal line DL formed over the insulation film GI.

That is, in forming the drain signal lines DL which extend in the y direction and are arranged in parallel in the x direction in the drawing, by extending portions of the drain signal lines DL to a position on an upper surface of the semiconductor layers AS, such extension portions are formed as the drain electrodes SD2 of the thin film transistors TFT.

Further, electrodes which are formed in a spaced apart manner from the drain electrodes SD2 at this point of time constitute the source electrode SD1. The source electrodes SD1 are connected to pixel electrodes PIX which will be explained later. To ensure the connection portions, the source electrodes SD1 have a pattern such that the source electrodes SD1 have extension portions slightly extending to the center side of the pixel region.

Here, semiconductor layers which are doped with impurity are formed in interfaces defined between the drain electrode SD2, the source electrode SD1 and the semiconductor layer AS. The impurity-doped semiconductor layers function as contact layers.

After forming the semiconductor layer AS, the impurity-doped semiconductor layers having a thin film thickness are formed on the surface of the semiconductor layer AS, and the drain electrode SD2 and the source electrode SD1 are formed. Thereafter, using the above-mentioned respective electrodes as masks, portions of the impurity-doped semiconductor layers which are exposed from the respective electrodes are etched thus forming the above-mentioned constitution.

Over the surface of the transparent substrate SUB1 on which the drain signal lines DL (drain electrodes SD2, source electrodes SD1) are formed in the above-mentioned manner, a protective film PSV made of SiN, for example, is formed such that the protective film PSV also covers the drain signal lines DL and the like.

The protective film PSV is provided for obviating the direct contact of the thin film transistors TFT with the liquid crystal and contact holes CH which expose portions of the extension portions of the source electrodes SD1 of the thin film transistors TFT are formed in the protective film PSV.

Over an upper surface of the protective film PSV, the transparent pixel electrodes PIX made of an IZO (Indium-Zinc-Oxide), for example, are formed such that the pixel electrodes PIX cover a major portion of the pixel region.

The pixel electrodes PIX are formed such that the pixel electrodes PIX also cover the contact holes CH formed in the protective film PSV and hence, the pixel electrodes PIX are connected with the source electrodes SD1 of the thin film transistors TFT.

Further, on the surface of the transparent substrate SUB1 on which the pixel electrodes PIX are formed, an orientation film ORI1 is formed such that the orientation film ORI1 also covers the pixel electrodes PIX. The orientation film ORI1 is made of resin, for example, and the rubbing treatment is applied to the surface of the orientation film ORI1 in a fixed direction. The orientation film ORI1 is brought into contact with the liquid crystal LC so as to determine the initial orientation direction of the liquid crystal LC.

On a surface of the transparent substrate SUB1 opposite to the liquid crystal LC, a polarizer POL1 is formed.

On the other hand, on the liquid-crystal-side surface of the transparent substrate SUB2, a black matrix BM is formed such that the black matrix BM defines respective pixel regions.

The black matrix BM is provided for obviating the radiation of an external light to the thin film transistors TFT and for enhancing a contrast of display.

Further, color filters FIL having colors corresponding to respective pixel regions are formed in hole portions (constituting regions which allow the transmission of light and substantially constituting the pixel regions) of the black matrix BM.

These color filters FIL are, for example, constituted of filters of same color in respective pixel regions arranged in parallel in the y direction, while the color filters FIL of red®, green (G) and blue (B), for example, are repeatedly arranged sequentially for every pixel region in the x direction.

On a surface of the transparent substrate SUB2 on which the black matrix BM and the color filters FIL are formed, a leveling film OC which is made of resin is formed by coating or the like, for example, such that the leveling film OC also covers the black matrix BM and the like. Due to such a constitution, the stepped portions formed by the black matrix BM and the color filters FIL do not become apparent.

Over a surface of the leveling film OC, a counter electrode CT made of ITO is formed in common with respect to respective pixel regions.

The counter electrode CT generates an electric field corresponding to the video signals (voltages) between the counter electrode CT and the respective pixel electrodes PIX in the respective pixel regions so as to control the orientation direction of the liquid crystal LC between these respective electrodes, and the optical transmissivity is controlled based on a suitable combination of such a control, the previously-mentioned polarizer POLL and a polarizer POL2 which will be explained later.

Further, on the surface of the transparent substrate SUB2 on which the counter electrode CT is formed in such a manner, an orientation film ORI2 is formed such that the orientation film ORI2 also covers the counter electrode CT. The orientation film ORI2 is made of resin, for example, and the rubbing treatment in a fixed direction is applied to the surface thereof. The orientation film ORI2 is brought into contact with the liquid crystal so as to determine the initial orientation direction of the liquid crystal LC.

Then, to a surface of the transparent substrate SUB1 opposite to the liquid crystal LC, the polarizer POL2 is applied.

Constitution of Terminal Portion

Figure 1A:
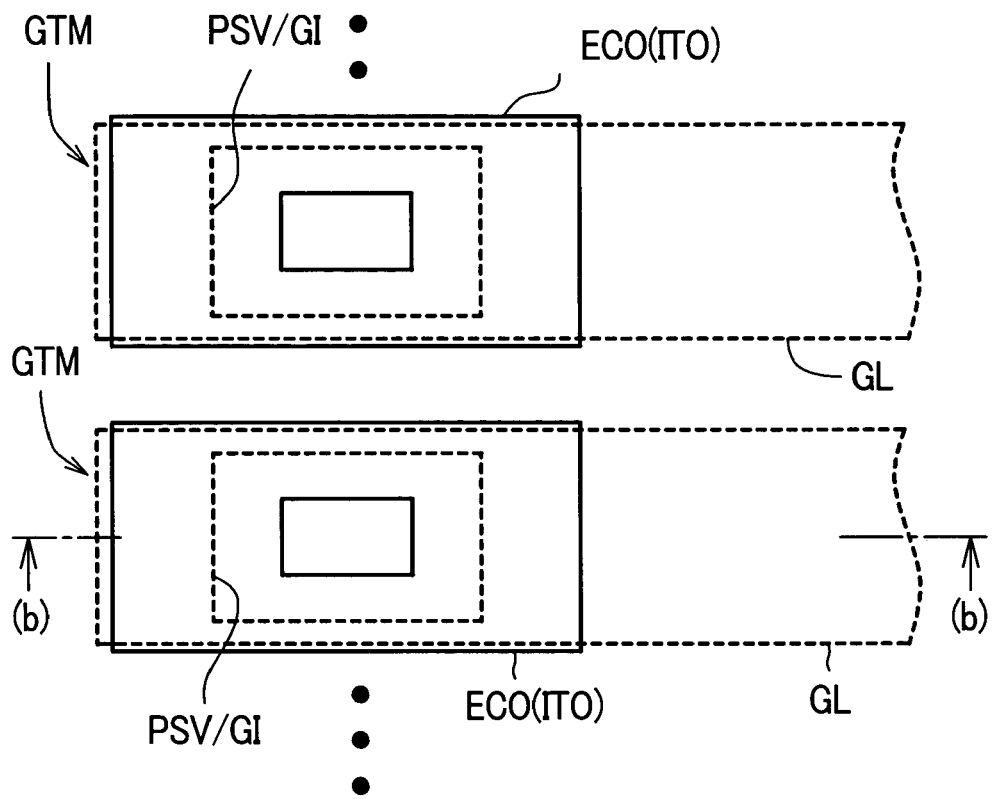
FIG. 1 is a view showing the constitution of an essential part (terminal portion) showing one embodiment of a liquid crystal display device according to the present invention.
Figure 1B:
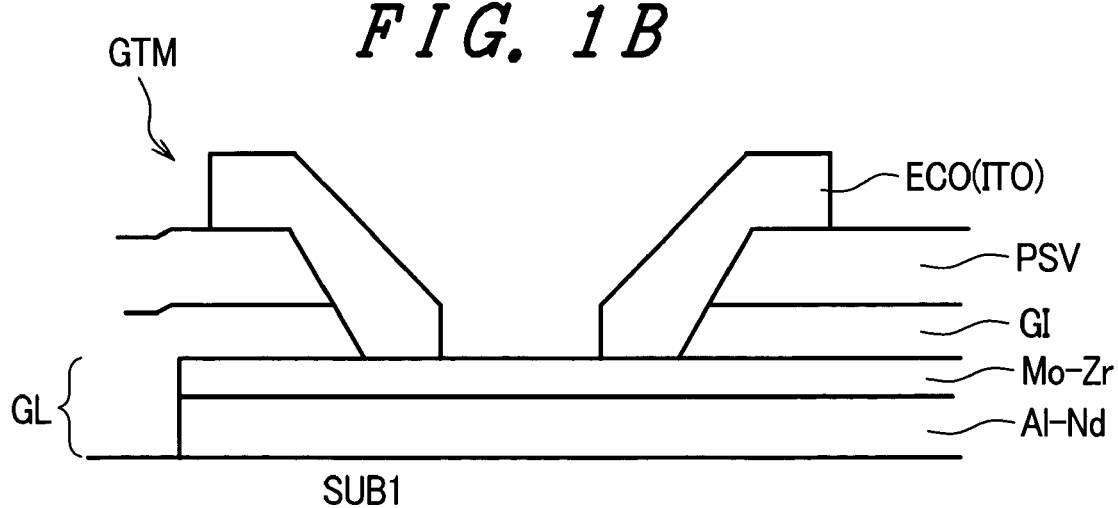

FIG. 1 is a view showing the constitution of the above-mentioned gate terminal portions GTM, wherein FIG. 1(a) is a plan view showing two out of a plurality of gate terminal portions GTM which are arranged in parallel to each other and FIG. 1(b) is a cross-sectional view taken along a line b—b in FIG. 1(a).

First of all, the gate signal lines GL which are extended from the display part AR are formed on the surface of the transparent substrate SUB1.

The gate signal line GL is formed of a sequential laminated body which is constituted of an Al—Nd layer and a Mo—Zr layer.

Although the gate signal line GL is originally in a state that the gate signal line GL is covered with the insulation film GI made of SiN and the protective film PSV made of SiN, by forming holes in the region where terminal portions are formed such that the gate signal lines GL are exposed from the protective film PSV and the insulation film GI.

In this case, it is preferable to form the hole in the protective film PSV and the insulation film GI using a fluoric dry etching gas. Compared to the wet etching, the dry etching is advantageous in forming holes in the terminal portion and forming contact holes in the pixel portion in view of the fact that the dry etching exhibits the excellent processing accuracy and the excellent treatment time control property. Further, the Mo—Zr layer which forms the upper layer of the gate signal line GL exhibits the high dry etching resistance and hence, there is no possibility that the Mo—Zr layer is removed at the time of etching. From this viewpoint, by forming the gate signal line GL as the sequentially laminated body consisting of an Al—9.8 wt % Nd layer and the Mo—8 wt % Zr layer, the dry etching resistance can be further enhanced.

With respect to the exposed portion of the gate signal line GL in the region where the terminal portion is formed, a conductive oxide film ECO which is made of an ITO (Indium-Tin-Oxide) film, for example, is laminated to the periphery of the exposed portion except for the center portion.

In other words, the conductive oxide film ECO is formed on the protective film PSV in the periphery of the hole, extends to respective side walls of the protective film PSV and the insulation film GI in the hole and reaches the upper surface of the gate signal line GL. However, the conductive oxide film ECO is not formed on the center portion of the gate signal line GL which is exposed through the hole.

That is, at the center of the terminal portion of the gate signal line GL, the direct electric contact of the terminal portion and the other electrode to be connected is established without interposing the conductive oxide product ECO.

Each terminal portion GTM which is constituted in the above-mentioned manner is connected to a bump BUP of the semiconductor integrated circuit GDRC through an anisotropic conductive film (sheet) ACF. Here, the anisotropic conductive film ACF is formed of a sheet-like resin film containing a large number of conductive particles and is interposed between a group of the above-mentioned terminal portions GTM and the semiconductor integrated circuit GDRC. By applying a fixed pressure, the bump BUP and a conductive member (conductive oxide film ECO in one portion and Mo—Zr in another portion) of the terminal portion GTM are electrically connected to each other through the conductive particles.

That is, the bump BUP has the region which is directly (in other words, without by way of the conductive oxide film ECO) connected to the conductive material which constitutes the gate signal line GL at the terminal portion GTM and hence, the connection resistance can be drastically reduced. Further, the conductive oxide ECO which is formed in the periphery of the terminal portion GTM can sufficiently obviate the occurrence of the electrolytic corrosion at the terminal portion GTM even when the conductive oxide ECO is formed without covering the center of the terminal portion.

Further, the resin of the anisotropic conductive film ACF adheres the transparent substrate SUB1 and another object to be fixed (in this case, the semiconductor integrated circuit and flexible printed circuit board) to each other and, at the same time, plays a role of preventing the intrusion of moisture which may become a cause of the electrolytic corrosion into the terminal portions to some extent.

Figure 6:
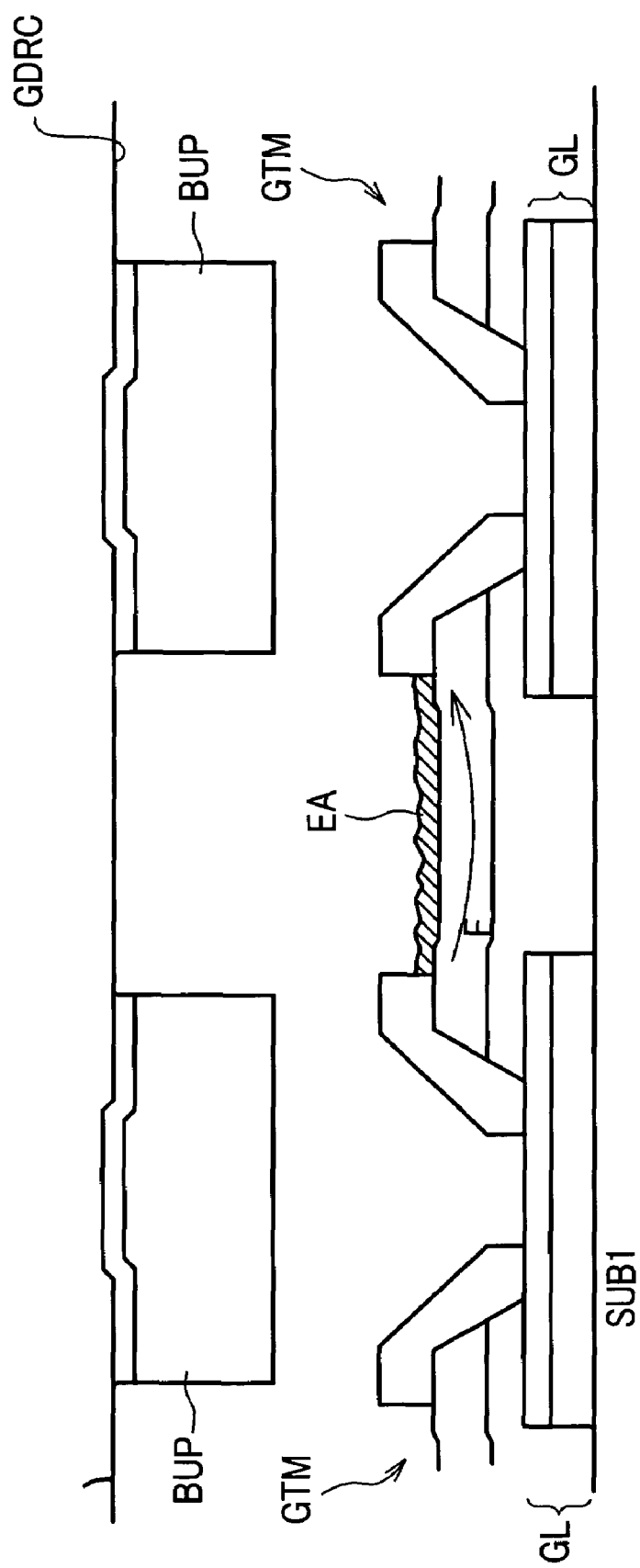
FIG. 6 is an explanatory view showing a principle in which an electrolytic corrosion occurs at the terminal portion due to an electric field generated between the terminal portion and other terminal portion which is arranged close to the terminal portion.

FIG. 6 shows two gate terminal portions GTM out of respective gate terminal portions GTM which are arranged in parallel and respective bumps BUP of the semiconductor integrated circuit GDRC which are connected to the respective gate terminal portions GTM. Here, as has been described above, the anisotropic conductive film ACF is interposed between the gate terminal portions GTM and the bumps BUP.

The electrolytic corrosion of the gate terminal portion GTM is an oxidizing phenomenon which occurs due to an electric field E generated based on the potential difference between the terminal portion GTM and the other terminal portion GTM due to the presence of an electrolytic solution EA such as water, for example, between the terminal portion GTM and the other neighboring terminal portion GTM. In view of the above, only when the conductive oxide film ECO is provided to the periphery of each gate terminal portion GTM, since the oxide film ECO per se is oxidized, the oxide film ECO performs a role of a stopper so as to prevent the oxidizing of the gate signal line GL at the center (portion which is not covered with the conductive oxide film) of the gate terminal portion GTM surrounded by the oxide film ECO.

Here, it is considered that with respect to the electric field E relevant to the electrolytic corrosion, the speed which progresses the electrolytic corrosion is influenced by the average magnitude of the electric field E when the waveform of a voltage applied to the terminal portion is complicated (for example, video signals which exhibit alternating waveform or signals given to the semiconductor integrated circuit).

Further, although the gate signal line GL forms the Mo—Zr layer as the upper layer thereof, it is confirmed that the electric connection resistance between this Mo—Zr layer and the conductive oxide film ECO made of ITO, IZO or the like becomes relatively small. Also from this viewpoint, it is possible to reduce the connection resistance between the terminal portion GTM of the gate signal line GL and other electrode as a whole.

This embodiment has been explained with respect to the constitution of the gate terminal portion GTM. However, it is needless to say that this embodiment is applicable to the terminal portions other than the gate terminal portion GTM. That is, this embodiment is also applicable to the input-side terminal portion GTM2 of the semiconductor integrated circuit GDRC, the terminal portion GTM which is connected to the terminal portion GTM2 by way of the wiring layer, the drain terminal portion DTM3, the input-side terminal portion DTM2 of the semiconductor integrated circuit DDRC, and the terminal portion DTM3 which is connected to the terminal portion DTM2 by way of the wiring layer.

Manufacturing Method

Subsequently, one embodiment of the manufacturing method of the transparent substrate SUB1 side of the above-mentioned liquid crystal display device is explained in conjunction with FIG. 7 to FIG. 9. In these drawings, characters at the center indicate the abbreviation of step names. Further, the left sides of these drawings show the flow of the processing of the thin film transistor TFT portion shown in FIG. 4 and the right sides of these drawings show the flow of the processing of the gate terminal portion GTM shown in FIG. 1 as viewed in a cross section.

Except for step B and step D, step A to step F are classified in accordance with respective photographic processing, wherein all cross-sectional views of respective steps show a stage in which the working after the photographic processing is completed and a photo resist is removed. Here, the photographic processing means, in the explanation of this flow chart, a series of operations in which the photo resist is applied, the selective exposure is performed using masks and then the developing is performed. The repeated explanation of the photographic processing is omitted. Hereinafter, the manufacturing method is explained in accordance with following classified steps.

Figure 7:
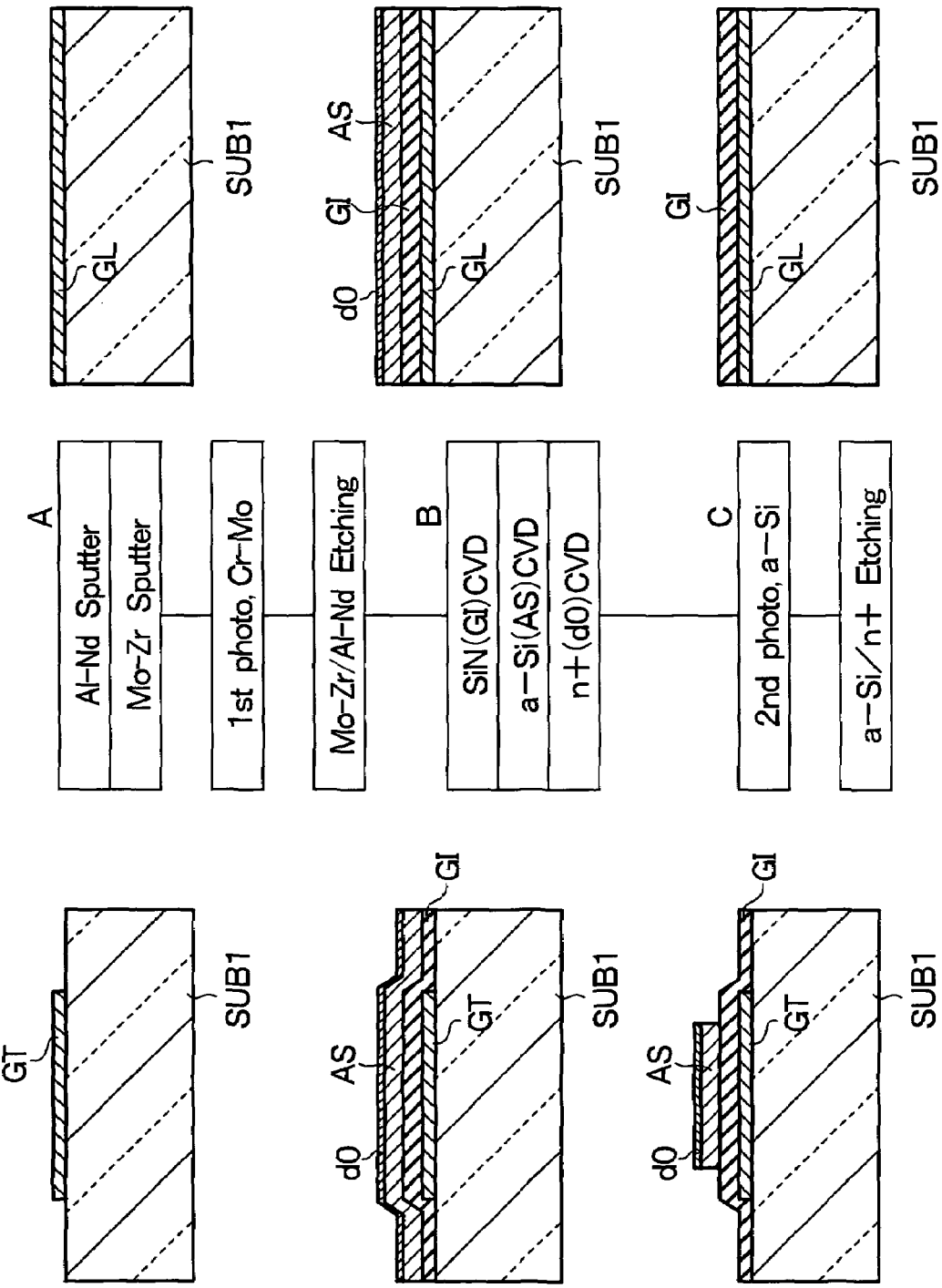
FIG. 7 is a flow chart showing one embodiment of a manufacturing method of the liquid crystal display device according to the present invention, wherein FIG. 7 constitutes an integral flow chart together with flow charts shown in FIG. 8 and FIG. 9.

Step A (FIG. 7)

On the transparent substrate SUB1 made of AN635 glass (product name), the Al—Nd layer having a film thickness of 2000 angstrom is formed by sputtering and, successively, the Mo—Zr layer having a film thickness of 400 angstrom is formed by sputtering on the Al—Nd layer. After the photographic processing, the Mo—Zr layer and the Al—Nd layer are collectively and selectively etched using an etchant made of phosphoric acid, nitric acid, acetic acid, deionized water, fluoric ammonium or the like.

Accordingly, the gate electrodes GT, the gate signal lines GL and the gate terminals GTM are formed.

Step B (FIG. 7B)

By introducing an ammonia gas, a silane gas, a nitrogen gas into the plasma CVD device, the silicon nitride film having a film thickness of 3500 angstrom is formed. The silane gas and the hydrogen gas are introduced into the plasma CVD device so as to form the i-type amorphous Si film having a film thickness of 1200 angstrom and, thereafter, the hydrogen gas and the phosphine gas are introduced into the plasma CVD device so as to form the N(+)-type amorphous Si film having a film thickness of 300 angstrom.

Step C (FIG. 7)

After performing the photographic processing, the N(+)-type amorphous Si film or the i-type amorphous Si film are selectively etched using SF6, CCl4 as a dry etching gas thus forming islands of i-type semiconductor layer AS.

Figure 8:
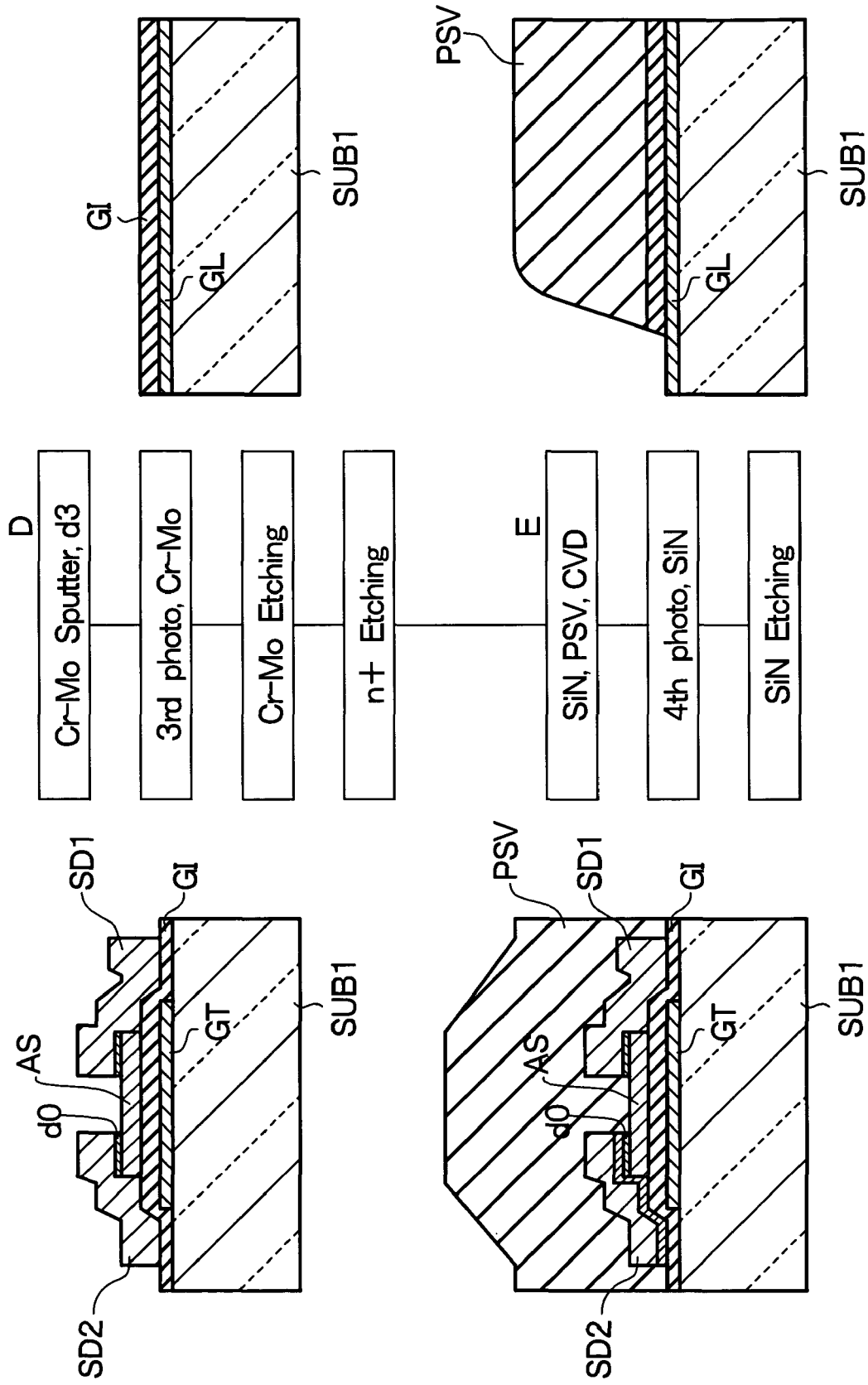
FIG. 8 is a flow chart showing one embodiment of a manufacturing method of the liquid crystal display device according to the present invention, wherein FIG. 8 constitutes an integral flow chart together with flow charts shown in FIG. 7 and FIG. 9.

Step D (FIG. 8)

A conductive film d3 made of Cr having a film thickness of 2000 angstrom is formed by sputtering. After performing the photographic processing, the conductive film d3 is etched using the similar solution as that of step A thus forming the drain signal lines DL, the source electrodes SD1 and the drain electrodes SD2.

Subsequently, CCl4, SF6 are introduced into the dry etching device as dry etching gases thus selectively removing the N(+)-type semiconductor layer d0.

Step E (FIG. 8)

By introducing an ammonia gas, a silane gas and a nitrogen gas into the plasma CVD device, a silicon nitride film having a film thickness of 0.4 $\mu$m is formed. After performing the photographic processing, the silicon nitride film is selectively etched using SF6 as a dry etching gas thus forming the protective film PSV and the insulation film GI by patterning.

Figure 9:
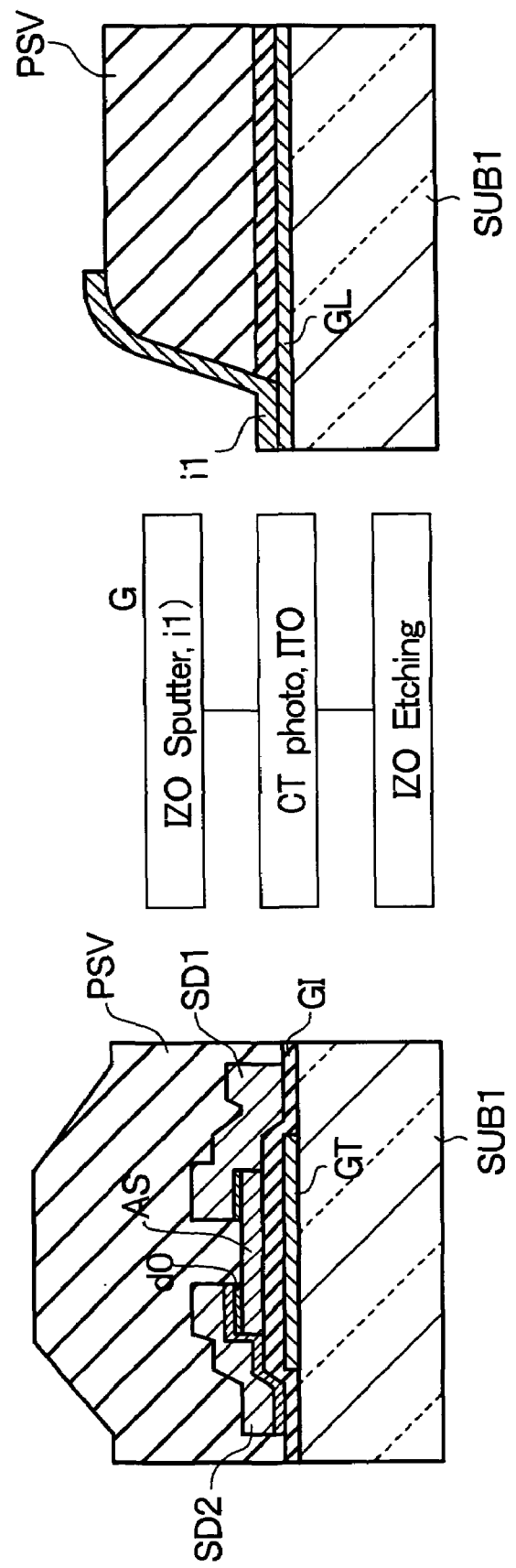
FIG. 9 is a flow chart showing one embodiment of a manufacturing method of the liquid crystal display device according to the present invention, wherein FIG. 9 constitutes an integral flow chart together with flow charts shown in FIG. 7 and FIG. 8.

Step F (FIG. 9)

A transparent conductive film i1 made of an IZO (Indium-Zinc-Oxide) film having a film thickness of 1150 angstrom is formed by sputtering. After performing the photographic processing, the transparent conductive film i1 is selectively etched using an oxalic acid aqueous solution as an etchant thus forming the uppermost layers of the gate terminal portions GTM and the uppermost layers of the drain terminal portions DTM.

Here, although IZO is used as the transparent conductive film i1, an amorphous ITO film may be used in place of IZO.

With the use of the oxalic acid aqueous solution as the etchant, it is possible to process IZO or amorphous ITO without dissolving the Al alloy, Mo alloy, Cr alloy or the like used as the materials of other signal lines. As a result, it is possible to form the transparent conductive film i1 without dissolving the Mo alloy or the like which is exposed at the terminal portions GTM, the DTM and the like. Further, there is no possibility that the wiring is dissolved even when there exist defects in the protective film PSV or the like. Accordingly, the transparent conductive film i1 can be manufactured with a high yield factor.

Embodiment 2

FIG. 10 is a view showing another embodiment of the liquid crystal display device according to the present invention and corresponds to FIG. 1(b).

The constitution which makes this embodiment different from the embodiment shown in FIG. 1(b) is that the gate signal line GL is formed of a sequential laminated body constituted of an Al—Nd layer and a Mo—Hf layer, a sequential laminated body constituted of an Al—Nd layer and a Mo—Cr layer, or a sequential laminated body constituted of an Al—Nd layer and a Mo—Ti layer.

By forming the gate signal lines GL using the laminated body made of these materials, the gate signal lines GL can be collectively processed using a general wet etchant (containing phosphoric acid and nitric acid as major components) which is used for selective etching of Al, for example, thus obviating the cumbersomeness of the steps.

Further, it is preferable to form holes in the protective film PSV and the insulation film GI which cover the gate signal lines GL using a fluoric dry etching gas. The Mo—Hf layer, the Mo—Cr layer or the Mo—Ti layer which is formed as the upper layer of the gate signal line GL exhibits the high dry etching resistance and hence, there is no possibility that these layers are removed at the time of etching. From this point of view, by forming the gate signal line GL as the sequentially laminated body consisting of an Al—9.8 wt % Nd layer as the lower layer of the laminated body and the Mo—1.6 wt % Cr layer as the upper layer of the laminated body, the dry etching resistance can be further enhanced.

Further, although the upper layer of the gate signal line GL is formed of the Mo—Hf layer, the Mo—Cr layer or the Mo—Ti layer, it is confirmed that the electric connection resistance between these layers and the conductive oxide film such as IZO or ITO is relatively small. Also from this viewpoint, the connection resistance between the terminal portion of the gate signal line GL and other electrode can be reduced as a whole.

Embodiment 3

FIG. 11 is a view showing another embodiment of the liquid crystal display device according to the present invention and corresponds to FIG. 10.

The constitution which makes this embodiment different from the embodiment shown in FIG. 10 is that the gate signal line GL is formed of a sequential laminated body constituted of a Cu alloy layer and a Mo—Zr layer or a sequential laminated body constituted of an Ag alloy layer and a Mo—Zr layer.

The gate signal line GL having such a constitution has an advantageous effect that the electric resistance can be reduced (for example, lower than the electric resistance of Al).

Further, it is preferable to form holes in the protective film PSV and the insulation film GI which cover the gate signal lines GL using a fluoric dry etching gas. The Mo—Zr layer which is formed as the upper layer of the gate signal line GL exhibits the high dry etching resistance and hence, there is no possibility that this layer is removed at the time of etching.

Further, by forming the upper layer of the gate signal line GL as the Mo—Zr layer, it is confirmed that the electric connection resistance between this layer and the conductive oxide film such as IZO or ITO is relatively small. Also from this viewpoint, the connection resistance between the terminal portion of the gate signal line GL and other electrode can be reduced as a whole.

Embodiment 4

FIG. 12 is a view showing another embodiment of the liquid crystal display device according to the present invention and corresponds to FIG. 1.

The constitution which makes this embodiment different from the constitution of the embodiment shown in FIG. 11 lies in that the gate signal lien GL is formed of a sequential laminated body constituted of a Ti layer, a pure Al layer and a Ti layer.

Since the gate signal line GL adopts the constitution in which the pure Al layer is interposed between the Ti layers, it is possible to suppress the electric resistance to a small value.

Further, since the gate signal line GL is formed of the laminated body made of such materials, it is possible to perform the collective processing using a general dry etching gas (chloride-based gas) used at the time of selective etching of Al, for example, thus obviating the cumbersomeness of the steps.

Further, it is preferable to form holes in the protective film PSV and the insulation film GI which cover the gate signal lines GL using a fluoric-based dry etching gas. It is because that the Ti layer formed as the upper layer of the gate signal line GL exhibits high dry etching resistance and hence, there is no possibility that the layer is removed by etching provided that the etching is performed in a relatively short time.

Further, by forming the Ti layer as the upper layer of the gate signal line GL, it is confirmed that the electric resistance between this layer and the conductive oxide film such as ITO or the like is relatively small. Also from this point of view, it is possible to reduce the connection resistance between the terminal portion of the gate signal line GL and other electrode as a whole.

Further, although the Ti layer is used as the upper layer of the gate signal line GL in the above-mentioned explanation, the similar advantageous effect can be obtained using a TiN layer in place of the Ti layer.

Embodiment 5

Figure 13:
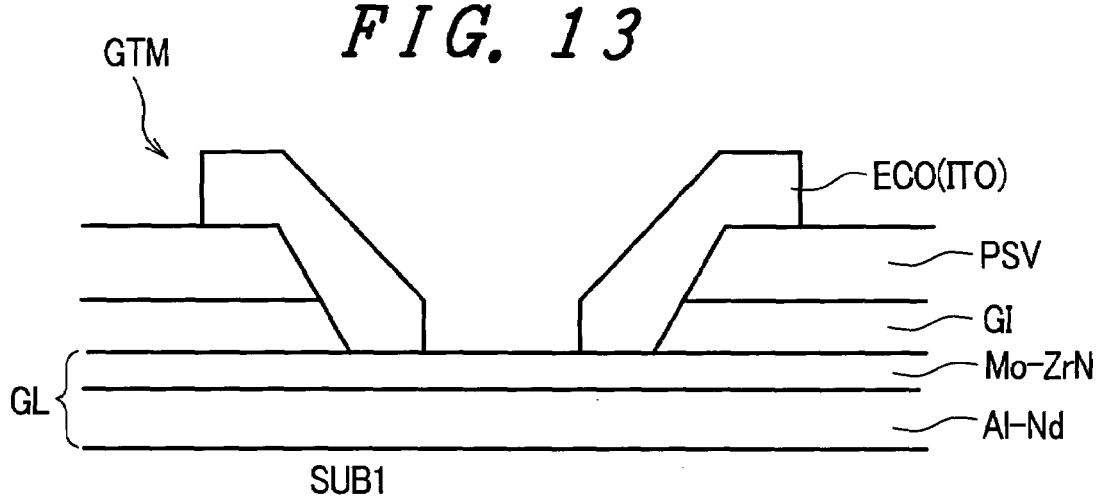
FIG. 13 is a cross-sectional view showing an essential part (terminal portion) of another embodiment of the liquid crystal display device according to the present invention.

FIG. 13 is a view showing another embodiment of the liquid crystal display device according to the present invention and corresponds to FIG. 12.

The constitution which makes this embodiment different from the embodiment shown in FIG. 12 lies in that the gate signal line GL is formed as a sequential laminated body constituting of the Al—Nd layer and the Mo—ZrN layer.

In this case, the Mo—ZrN layer can be formed by mixing nitrogen at the time of forming the Mo—Zr layer by sputtering, for example, thus forming a layer which exhibits the high moisture resistance. This implies that it is possible to obtain an advantageous effect that the reliability of connection with the anisotropic conductive film ACF can be enhanced.

Since the gate signal line GL is constituted such that the gate signal line GL contains Al, it is possible to suppress the electric resistance of the gate signal line GL at a small value.

Further since the gate signal line GL is formed of the laminated body made of these materials, it is possible to perform the collective processing using a general wet etchant (containing phosphoric acid and nitric acid as major components) at the time of performing the selective etching Al, for example, whereby it is possible to obviate the cumbersomeness of the steps.

Further, it is preferable to form holes in the protective film PSV and the insulation film GI which cover the gate signal lines GL using a fluoric-based dry etching gas. It is because that the Mo—ZrN layer formed as the upper layer of the gate signal line GL exhibits the high dry etching resistance and hence, there is no possibility that the layer is removed at the time of performing the etching.

Further, by forming the Mo—ZrN layer as the upper layer of the gate signal line GL, it is confirmed that the electric resistance between this layer and the conductive oxide film such as IZO, ITO or the like is relatively small. Also from this point of view, it is possible to reduce the connection resistance between the terminal portion of the gate signal line GL and other electrode as a whole.

Embodiment 6

Figure 14:
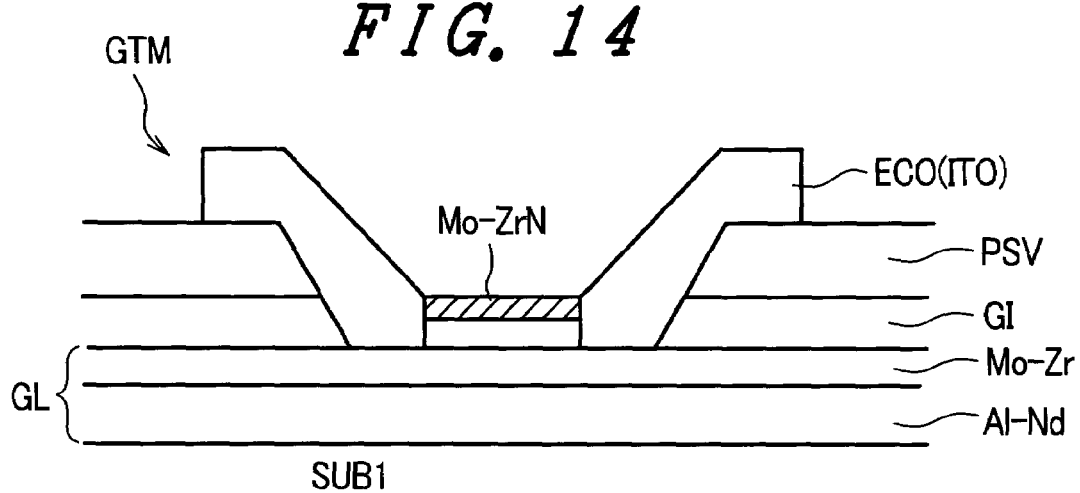
FIG. 14 is a cross-sectional view showing an essential part (terminal portion) of another embodiment of the liquid crystal display device according to the present invention.

FIG. 14 is a view showing another embodiment of a liquid crystal display device according to the present invention and corresponds to FIG. 13.

The constitution which makes this embodiment different from the embodiment shown in FIG. 13 lies in that the gate signal line GL is formed of a sequential laminated body consisting of an Al—Nd layer and a Mo—Zr layer and an Mo—ZrN layer is formed on a surface of the Mo—Zr layer exposed from an IZO film.

In this case, the Mo—ZrN layer is formed by mixing nitrogen into the surface of Mo—Zr layer by a nitrogen plasma device using the IZO film as a mask after forming an ITO layer.

Due to such a constitution, this embodiment can obtain advantageous effects equal to those of the embodiment 5.

Embodiment 7

Figure 15:
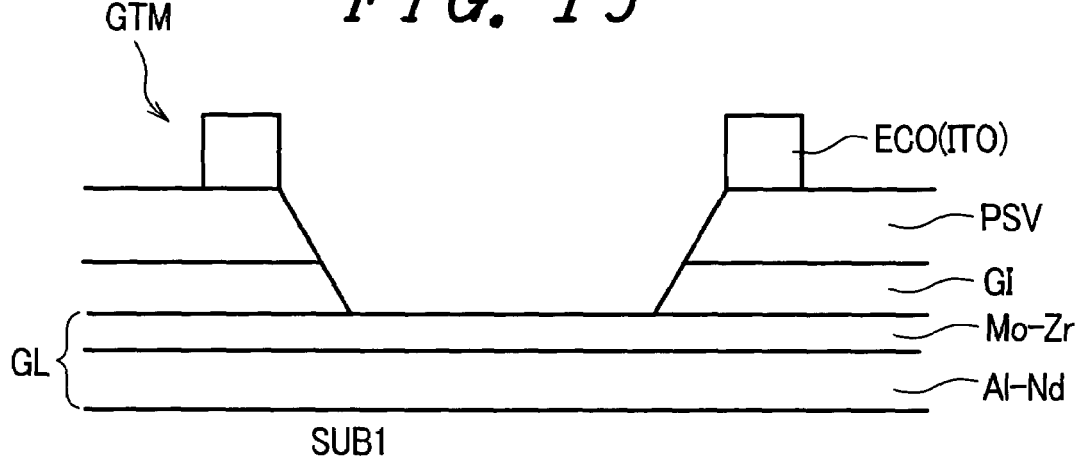
FIG. 15 is a cross-sectional view showing an essential part (terminal portion) of another embodiment of the liquid crystal display device according to the present invention.

FIG. 15 is a view showing another embodiment of a liquid crystal display device according to the present invention and corresponds to FIG. 1(b).

The constitution which makes this embodiment different from the embodiment shown in FIG. 1(b) lies in that the conductive oxide film ECO which is formed in the periphery of the terminal portion is formed on the surface of a protective film PSV without being connected to the gate signal line GL.

This is because that the conductive oxide film ECO is served as means for preventing a chemical reaction which may induce an oxidizing phenomenon generated between the terminal portion on which the oxide film ECO is formed and the neighboring other terminal portion and hence, it is not always necessary to connect the oxide film ECO with the gate signal line GL and it is sufficient if the oxide film ECO is formed such that the oxide film ECO surrounds a portion where the electrolytic corrosion occurs.

It is needless to say that the constitution of such a conductive oxide film ECO is applicable to respective cases explained in the embodiment 2 (FIG. 10) and the embodiment 6 (FIG. 14).

Embodiment 8

In the above-mentioned respective embodiments, the surface of the gate signal line GL which is exposed from the terminal portion GTM is configured such that the conductive oxide film ECO is not formed at the center portion of the surface.

Figure 16A:
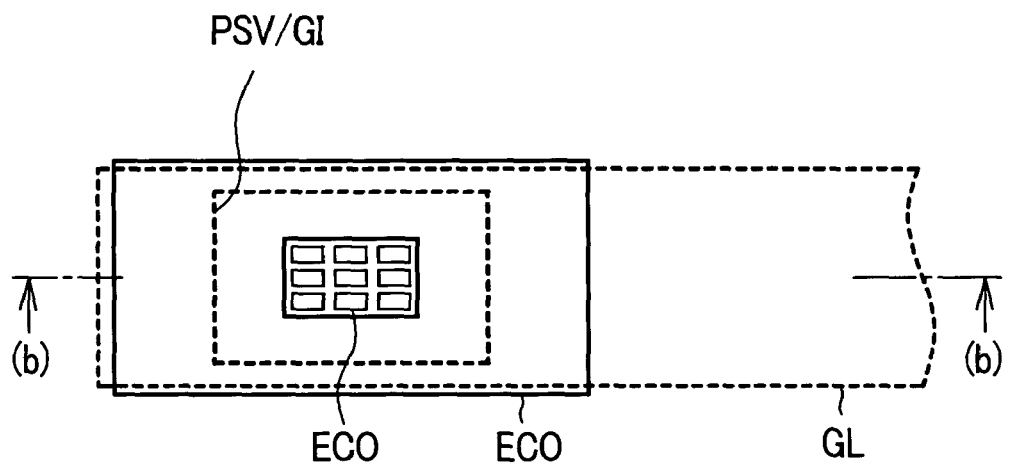
FIG. 16 is a view showing the constitution of another embodiment of the terminal portion of the liquid crystal display device according to the present invention.
Figure 16B:
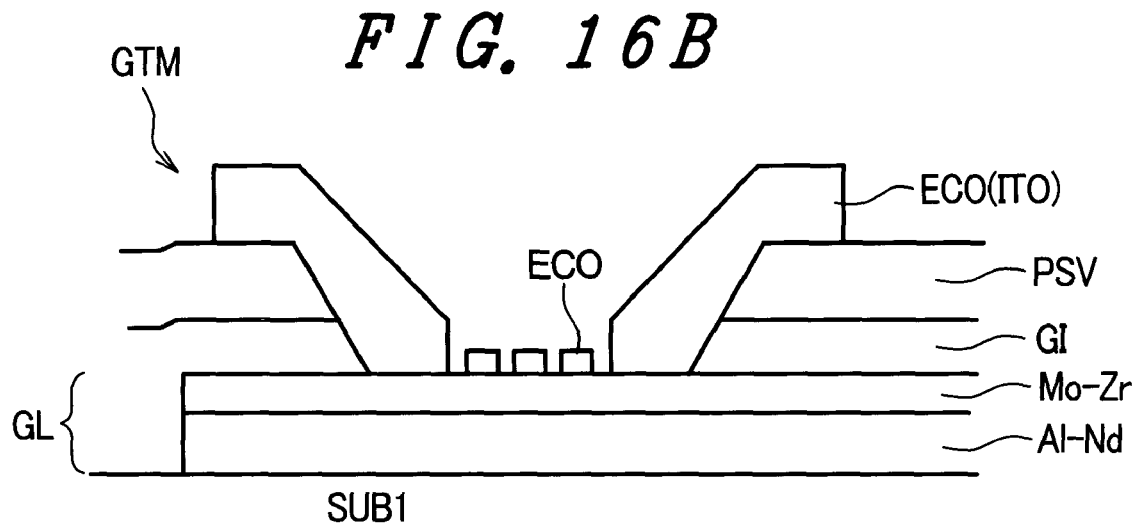

However, it is needless to say that, as shown in FIG. 16 which corresponds to FIG. 1, a plurality of island-like conductive oxide films ECO may be arranged such that they are scattered at the center portion of the terminal portion GTM.

This is because that the connection with small connection resistance can be achieved at the exposed portion of the gate signal line GL between respective conductive oxide films in this case.

Figure 17:
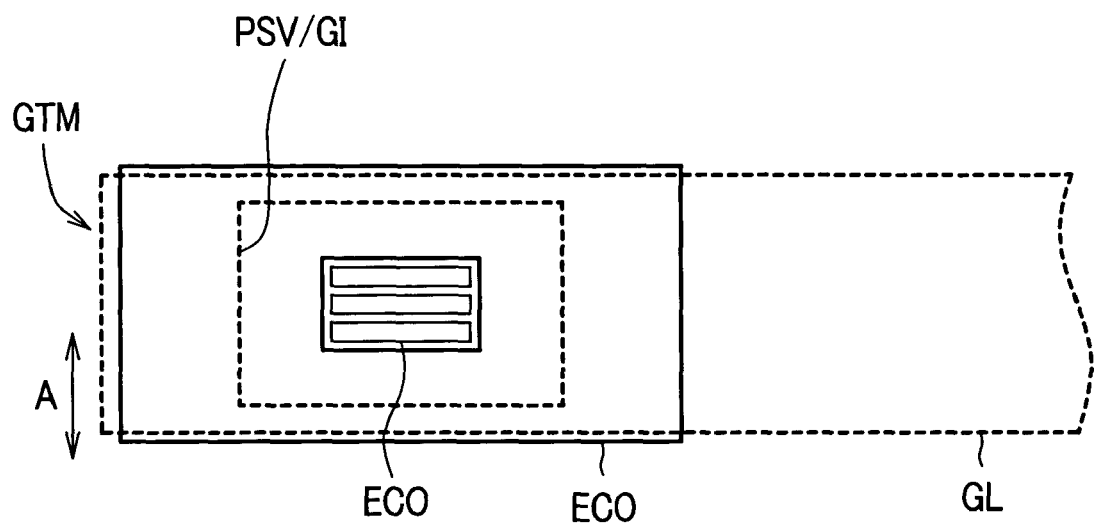
FIG. 17 is a plan view showing another embodiment of the terminal portion of the liquid crystal display device according to the present invention.

To achieve the same objective, as shown in FIG. 17, on the surface of the gate signal line GL which is exposed from the terminal portion GTM, the conductive oxide films ECO which extend in the extending direction of the gate signal line GL are arranged in parallel in the direction which is orthogonal to the extending direction of the gate signal line GL.

Figure 18:
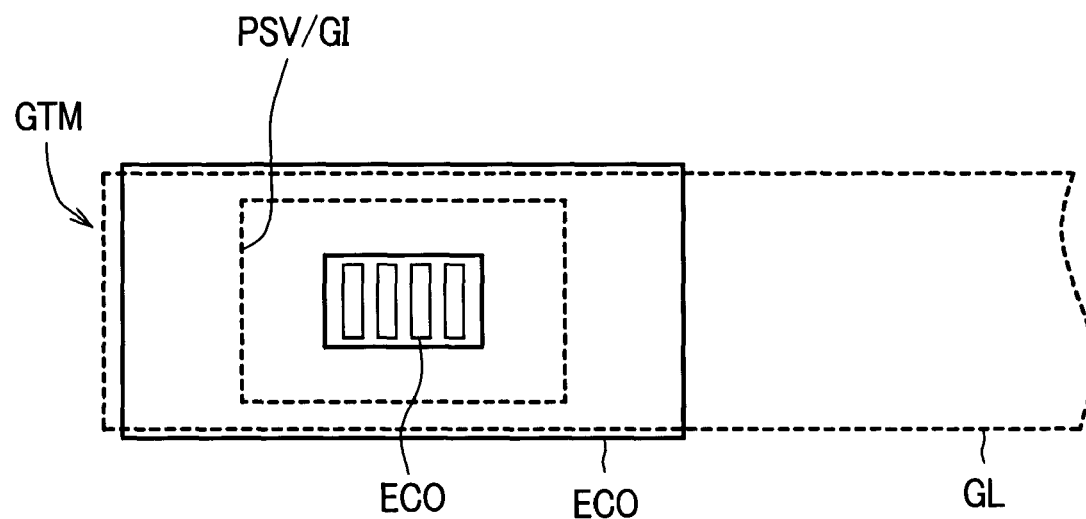
FIG. 18 is a plan view showing another embodiment of the terminal portion of the liquid crystal display device according to the present invention.

Further, as shown in FIG. 18, on the surface of the gate signal line GL exposed from the terminal portion GTM, the conductive oxide films ECO which extend in the direction orthogonal to the extension direction of the gate signal lines GL may be arranged in parallel in the extension direction of the gate signal lines GL.

Here, by adopting the constitution shown in FIG. 17, it is possible to obtain following advantageous effects. That is, when it is necessary to peel off a semiconductor integrated circuit GDRC after being mounted, a residual material of the anisotropic conductive film ACF may be peeled off by a slight polishing. In this case, the polishing direction is directed in an arrow direction A shown in FIG. 17 and hence, a drawback that the surface of the gate signal line GL is shaved off together with the surface of the gate signal line GL can be reduced.

Embodiment 9

The above-mentioned respective embodiments describe the constitution of the terminal portion for supplying scanning signals to the gate signal line GL. However, it is needless to say that the present invention is applicable to the terminal portion for supplying the video signals to the drain signal lines DL.

When the present invention is applied to the terminal portion of the drain signal line DL, the drain signal line DL is formed of a laminated body in the same manner as the above-mentioned respective embodiments. However, the case differs from the respective embodiments in that the drain signal line DL is formed on an upper surface of at least an insulation film GI for ensuring the interlayer insulation between the drain signal line DL and the gate signal line GL.

Embodiment 10

In the constitution which laminates the conductive oxide film ECO to the periphery of the terminal portion, it may be possible to apply the conductive oxide film ECO to a whole portion of each terminal portion of each gate signal line GL or a whole portion of each terminal portion of each drain signal line DL.

However, with respect to respective terminal portions which are arranged in parallel close to each other, the above-mentioned constitution may be adopted by every other terminal portion, for example, and the conductive oxide film is not formed on other remaining terminal portions.

To consider the fact that the electrolytic corrosion of the terminal portion is an oxidizing reaction which is generated when an electrolytic solution is present between the terminal portion and the other terminal portion and the potential difference is generated between respective terminal portions, it is possible to obtain a sufficient advantageous effect by providing an element (the conductive oxide film in this embodiment) which does not generate the oxidizing reaction at one terminal portion.

Accordingly, it may be possible to adopt the constitution in which the conductive oxide film ECO is not formed on the periphery of each terminal portion and the conductive oxide film ECO may be formed on the peripheries of other neighboring terminal portions arranged at both sides of the terminal portion.

Further, in respective terminal portions which are arranged in parallel close to each other, there may be a case that it is unnecessary to form the conductive oxide films. This is a case that an average electric field applied between the terminals arranged close to each other becomes substantially 0. To be more specific, both output terminals of the video signals which supply alternating signals are considered, for example. Besides such output terminals, both terminals served for supplying digital signal data among signals supplied to the semiconductor integrated circuit are considered.

Embodiment 11

The above-mentioned embodiments have been explained with respect to a so-called vertical electric field type as the constitution of the pixels. However, it is needless to say that the present invention is not limited to such embodiments and is applicable to a so-called lateral electric field type, for example.

This is because that even with respect to the lateral electric field type liquid crystal display device, drawbacks similar to the drawbacks of the vertical electric field type liquid crystal display device have been generated with respect to their terminal portions.

Figure 19:
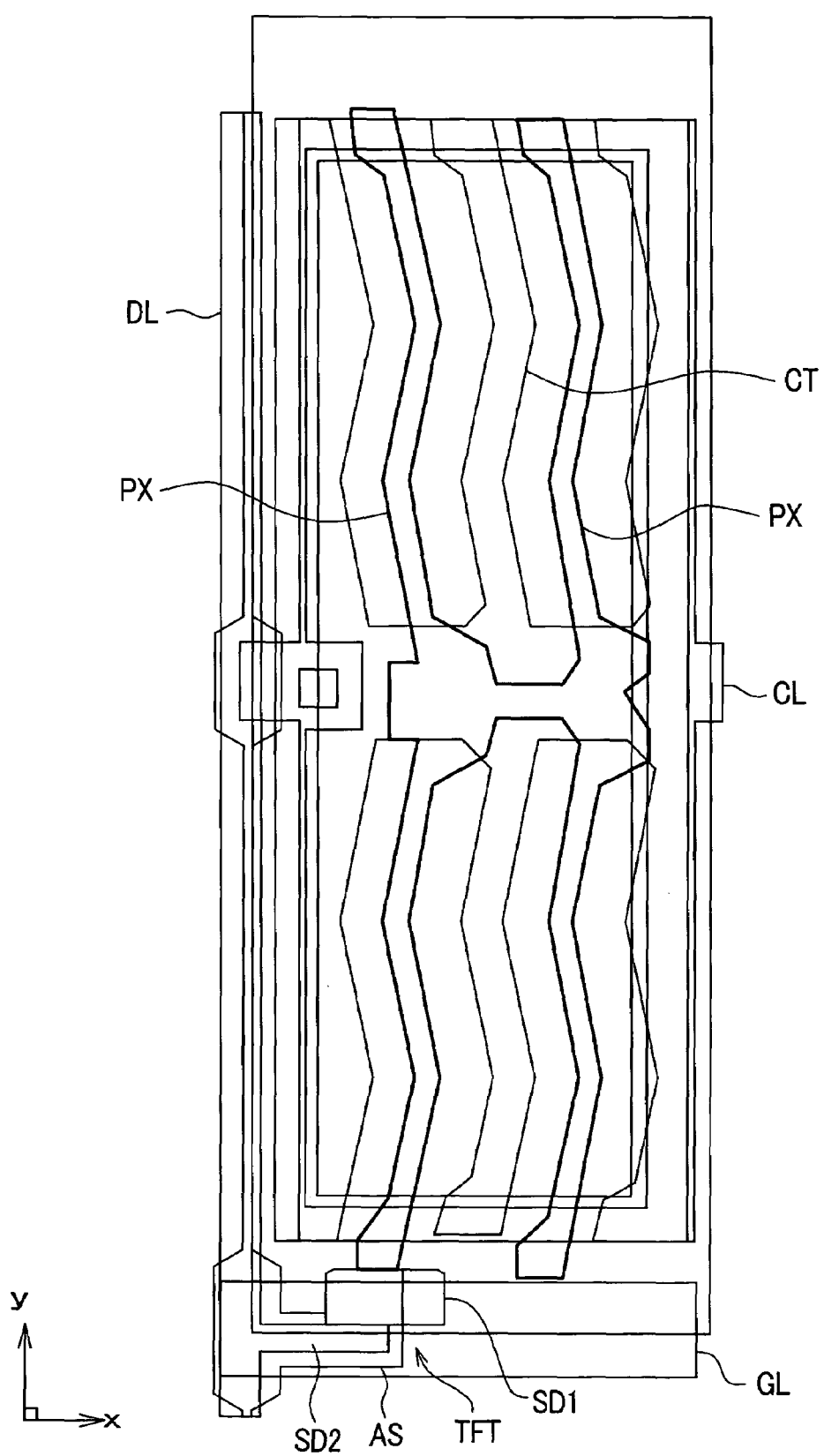
FIG. 19 is a plan view showing one embodiment of the constitution of the pixel of the liquid crystal display device according to the present invention.

FIG. 19 is a plan view showing one embodiment of the constitution of the pixel according to the lateral electric field type liquid crystal display device.

In this lateral electric field type liquid crystal display device, counter electrodes CT are formed on a liquid-crystal side surface of a transparent substrate SUB1 on which pixel electrodes PX are formed, and these electrodes are alternately arranged respectively forming stripe-like patterns (extending in the y direction in the drawing).

The pixel electrodes PX and the counter electrodes CT are formed in different layers by way of the insulation film and the optical transmissivity of the liquid crystal is controlled by an electric field having components substantially parallel to the transparent substrate SUB1 out of electric fields generated between the pixel electrodes PX and the counter electrodes CT.

Here, the reason that the respective electrodes PX, CT have a plurality of bent portions in the extending dirction thereof is that the liquid crystal display device adopts a so-called multi-domain method which obviates a phenomenon that two regions which differ in the directions of the electric field generated between the pixel electrodes PX and the counter electrodes CT are formed and a change of color tone is generated when the observation is made from the different directions with respect to a display surface.

Here, each pixel region is formed in the region which is surrounded by gate signal lines GL which extend in the x direction and are arranged in parallel in the y direction and drain signal lines DL which extend in the y direction and are arranged in parallel in the x direction, wherein one drain signal line DL is connected to the pixel electrodes PX by way of the thin film transistors TFT in the same manner as the constitution shown in FIG. 3. However, the constitution of this embodiment differs from the constitution shown in FIG. 3 in that counter voltage signal lines CL which supply the counter voltage signals to respective counter electrodes CT are newly formed.

Although counter voltage signals are supplied to the counter voltage signal lines CL at terminal portions thereof outside a region of a display part AR, for example, it is needless to say that the present invention is applicable to these counter voltage signal lines CL and terminal portions thereof in the same manner as the terminal portions GTM, DTM of the gate signal lines GL or the drain signal lines DL.

Figure 20:
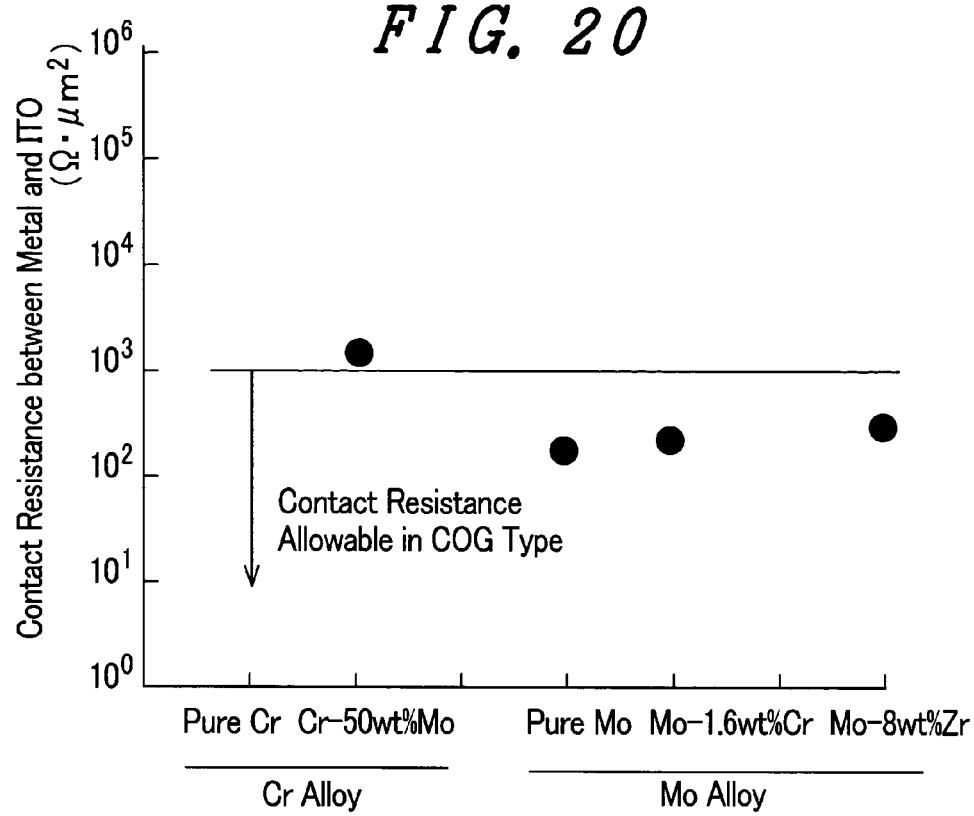
FIG. 20 is a graph showing the connection resistance with ITO at the terminal portion.

Review (1) Although it has been explained heretofore that the high-melting-point metal film such as the Mo alloy can obtain the favorable contact with the conductive oxide film such as the ITO film, FIG. 20 shows a graph in which a contact state of the Mo alloy and the ITO film is compared with a contact state of the Cr alloy and the ITO film.

As can be understood from the drawing, the contact resistance of the Mo alloy with the ITO film is equal to or less than $1\times10^3$ $\Omega\cdot\mu m^2$ and this satisfies the resistance required by the COG method.

Further, even when the IZO is used as the conductive oxide film, the contact resistance of the Mo alloy and the IZO film can be made lower than that of the Cr alloy and the IZO film.

(2) To select the material of a layer which is formed as an uppermost layer of the signal line, it is necessary to satisfy followings conditions (A) and (B) at the same time.

(A) When the laminated line having the aluminum alloy is collectively etched by a shower-type wet etching which has been generally performed with respect to the large-sized substrate processing or the like, it is necessary to form the cross section of the signal line in a normally tapered shape thus improving the coverage of the insulation film formed as a layer above the signal layer.

(B) It is necessary to ensure the resistance against the dry etching using the fluoric gas such as SF6 such that even when the connection means such as the contact holes are formed in the SiN insulation film which constitutes an upper layer of the line, the layer which constitutes an uppermost layer of the signal line is not dissipated at the bottom portion of the contact hole so that the layer and the pixel electrode or the like are connected to each other.

Figure 21:
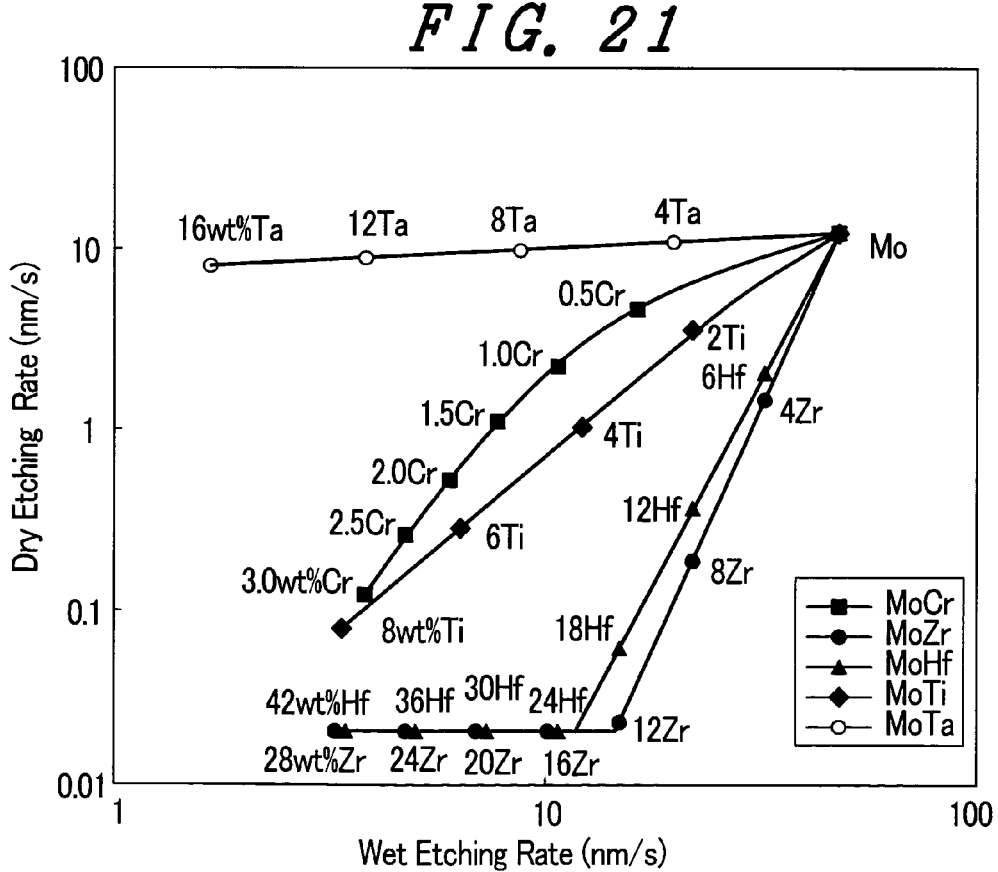
FIG. 21 is a graph showing the relationship between the wet etching and the dry etching of a signal line having an element added to Mo in an upper layer thereof.

When the layer which constitutes an uppermost layer of the signal line is made of molybdenum-based alloy, the composition which can solve both tasks (A) and (B) at the same time is selected in the following manner. An alloy is prepared by adding various alloy addition elements such as chromium, titanium, tantalum, zirconium, hafnium to molybdenum in respectively varying concentrations. Then, a dry etching rate of the molybdenum alloy due to the SF6 gas and the wet etching rate of the molybdenum alloy due to the phosphoric acid-acetic acid-nitric acid solution are measured. FIG. 21 shows the result of the measurement in a collective form, wherein the wet etching rate is taken on the axis of abscissas and the dry etching rate is taken on the axis of the ordinates. Here, the detectable lower limit of the dry etching rate is 0.02 nm/s.

It is understood from the drawing that, to solve the task (A), it is necessary to ensure the wet etching rate (5.1 nm/s in this case) which is equal to or more than the etching rate of the aluminum alloy. To satisfy this condition, when zirconium is added, an addition amount must be equal to or less than 23 weight %, when hafnium is added, an addition amount must be equal to or less than 36 weight %, when chromium is added, an addition amount must be equal to or less than 3.0 weight %, and when titanium is added, an addition amount must be equal to or less than 7.6 weight %.

Further, It is understood from the drawing that, to solve the task (B), it is necessary to ensure the selection ratio with SiN of at least 7 or more. Since the dry etching rate of SiN due to the SF6 gas is 19.4 nm/s, the dry etching rate of the layer which constitutes an uppermost layer of the signal line must be not more than 2.78 nm/s. To satisfy this condition, when zirconium is added, an addition amount must be equal to or more than 2.6 weight %, when hafnium is added, an addition amount must be equal to or more than 4.9 weight %, when chromium is added, an addition amount must be equal to or more than 0.84 weight %, and when titanium is added, an addition amount must be equal to or more than 2.3 weight %.

In spite of the fact that the dry etching rate of the molybdenum-tantalum alloy is not reduced largely, the wet etching rate of the molybdenum-tantalum alloy is largely reduced and hence, the molybdenum-tantalum alloy is not suitable for solving the above-mentioned tasks (A) and (B).

Figure 22:
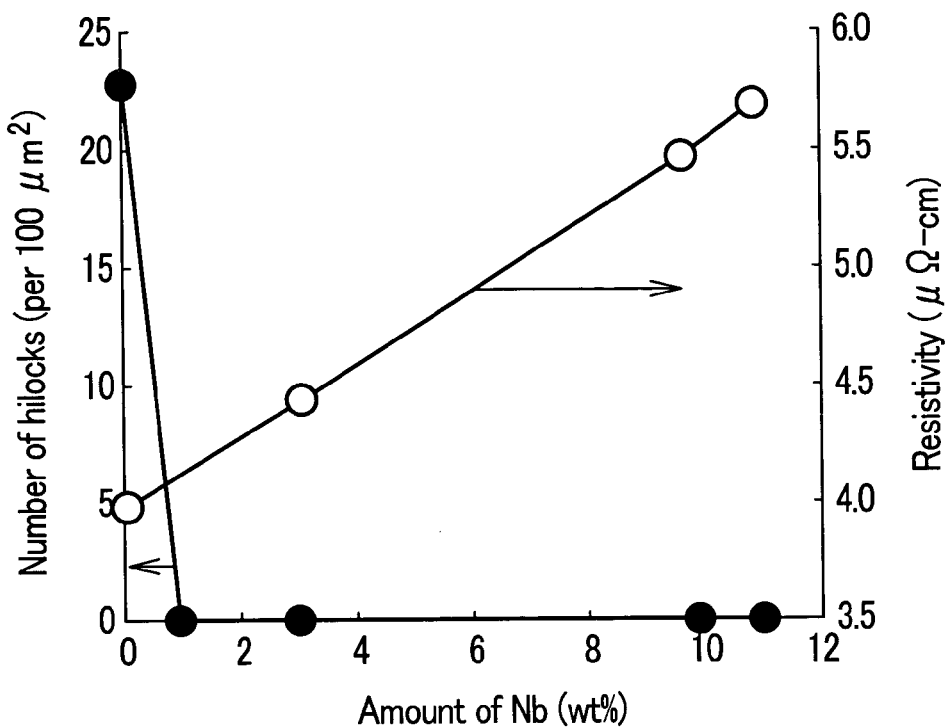
FIG. 22 is a graph showing the number of hillocks with respect to an alloying quantity of Nd to Mo in an upper layer of a signal line containing Al.

(4) Further, with respect to the signal lines made of the Al alloy, in view of the specification which requires the large screen and high definition, it is preferable that the resistivity is equal to or less than 5.5 $\mu\Omega$-cm. Further, to prevent the occurrence of whisker-like projections called hillocks in general in a step including the heat treatment at a temperature equal to or below approximately 300 degrees centigrade after the formation of the signal lines, as can be understood from a graph shown in FIG. 22, it is found that the preferable alloy composition of the Al alloy is Al —1 to 10 wt % of Nd. Although the graph shows a case in which the Al alloy is used, the same goes for other rare earth element.

In view of the above, in forming the signal line by laminating the Mo alloy to the upper layer of the alloy containing the rare earth element, it is preferable to set the composition of the Mo alloy to the rate explained in (3).

(5) When the signal line adopts the three layered structure such as a structure having a high melting point metal/Al/a high melting point metal, for example, it is possible to make the resistivity smaller than that of the above-mentioned signal line having the two-layered structure. In this case, even when Nd is alloyed in Al in a range of 0 to 1 wt %, it is possible to obtain the same advantageous effects.

Figure 23:
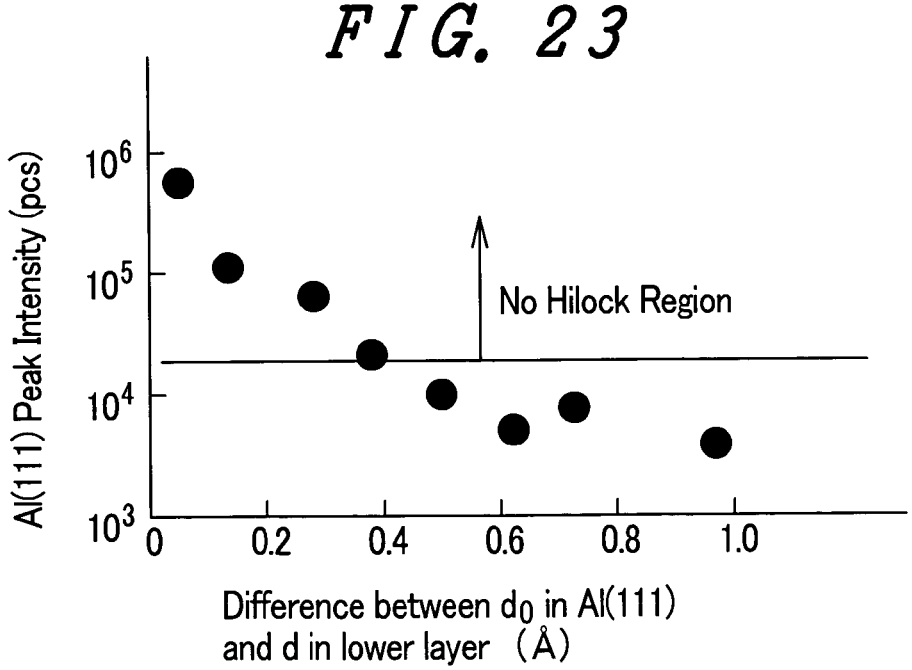
FIG. 23 is a graph showing that Ti and TiN are effective in suppressing hillocks.

Then, as can be understood from the graph shown in FIG. 23, by forming the background layer having the difference between a face distance d0 of Al(111) and a face distance d of the background layer d set to a value equal to or less than 0.4 angstrom, it is possible to largely suppress the occurrence of hillocks in the steps after the formation of the signal lines (step including the heat treatment at a temperature of equal to or below 300 degrees centigrade) by controlling the Al orientation due to the background layer. A Ti layer or a TiN layer is preferably used as the background layer.

First of all, as the high-melting-point metal layer which constitutes a layer above the Al layer, it is preferable to adopt Ti or TiN by taking the productivity and the maintenance in the sputtering device into consideration. In this case, the contact resistance of Ti or TiN becomes to approximately $6\times10^2$ $\Omega\cdot\mu cm^2$ and sufficiently satisfies $1\times10^3$ $\Omega\cdot\mu cm^2$ which is the above-mentioned specification of the CGO method.

Figure 24:
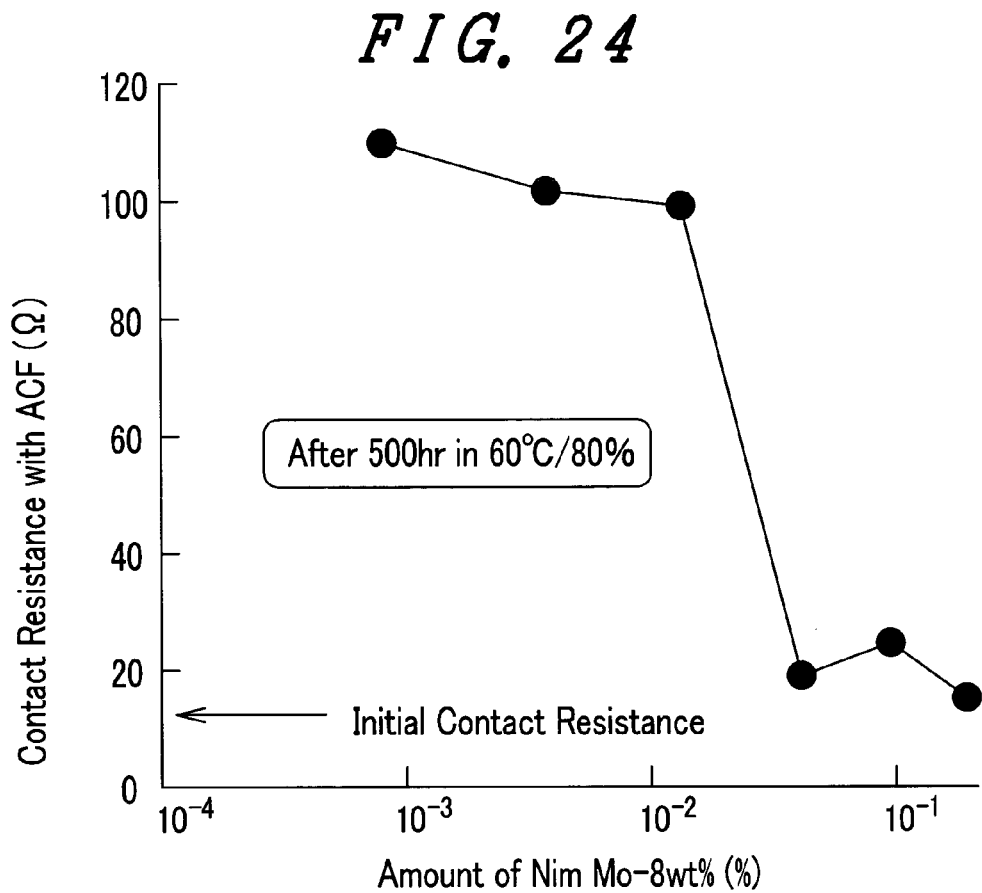
FIG. 24 is a graph showing the relationship between the moisture resistance of a Mo alloy film and a quantity of N mixed into the Mo alloy.

(6) Although it has been explained that the mixing of the nitrogen element (N) into the Mo alloy is effective to enhance the moisture resistance of the Mo alloy, FIG. 24 shows a graph which indicates the optimum mixing rate of N.

As can be clearly understood from the drawing, by mixing not less than 0.02 atom % of N into the Mo—8 wt % Zr, it is possible to suppress the connection resistance with the anisotropic conductive film ACF as much as possible.

Although FIG. 24 is a view showing the case in which Mo—8 wt % Zr is used, other Mo alloys exhibit the extremely similar electric characteristics and composition and hence, it is confirmed that these other Mo alloys can also exhibit the same advantageous effects.

As can be clearly understood from the foregoing explanation, according to the liquid crystal display device of the present invention, at the terminal portions, the occurrence of the electrolytic corrosion can be suppressed and, at the same time, the connection resistance between the terminal portion and other electrode to be connected can be largely reduced.

Although some embodiments related to the present invention have been expressed and described, the present invention is not limited to those embodiments per se and various modifications and improvements can be made within a range that those who are skilled in the art can know. Further, claims are not limited to the above-expressed or above-described details and include the above-mentioned modifications and the improvements.

What is claimed is:

1. A liquid crystal display device comprising:
signal lines;
an insulation film which covers the signal lines;
terminal portions having one portions of the signal lines exposed by forming holes in the insulation film, and conductive oxide films laminated to the terminal portions on a liquid-crystal-side surface of one substrate out of substrates which are arranged to face each other by way of liquid crystal;
wherein the conductive oxide films are laminated to peripheries except for centers of the terminal portions.

2. A liquid crystal display device according to claim 1, wherein the conductive oxides are ITO films or IZO films.

3. A liquid crystal display device according to claim 1, wherein the signal line is formed of a sequential laminated body constituted of an Al—Nd layer and a Mo—Zr layer.

4. A liquid crystal display device according to claim 3, wherein the Mo—Zr layer has the alloy composition of Mo—2.6 to 23 wt % Zr.

5. A liquid crystal display device according to claim 4, wherein the Al—Nd layer has the alloy composition of not less than 1 wt % of Al and not more than 10 wt % of Nd.

6. A liquid crystal display device according to claim 1, wherein the signal line is formed of a sequential laminated body constituted of an Al—Nd layer and a Mo—Cr layer.

7. A liquid crystal display device according to claim 6, wherein the Mo—Cr layer has the alloy composition of Mo—0.84 to 3.0 wt % Zr.

8. A liquid crystal display device according to claim 7, wherein the Al—Nd layer has the alloy composition of not less than 1 wt % of Al and not more than 10 wt % of Nd.

9. A liquid crystal display device according to claim 1, wherein at the signal line is formed of a sequential laminated body constituted of an Al—Nd layer and a Mo—Hf layer.

10. A liquid crystal display device according to claim 9, wherein the Mo—Hf layer has the alloy composition of Mo—4.9 to 41 wt % Hf.

11. A liquid crystal display device according to claim 10, wherein the Al—Nd layer has the alloy composition of not less than 1 wt % of Al and not more than 10 wt % of Nd.

12. A liquid crystal display device according to claim 1, wherein the signal line is formed of a sequential laminated body constituted of an Al—Nd layer and a Mo—Ti layer.

13. A liquid crystal display device according to claim 12, wherein the Mo—Ti layer has the alloy composition of Mo—2.3 to 7.6 wt % Ti.

14. A liquid crystal display device according to claim 13, wherein the Al—Nd layer has the alloy composition of not less than 1 wt % of Al and not more than 10 wt % of Nd.

15. A liquid crystal display device according to claim 1, wherein the signal line is formed of a sequential laminated body constituted of a Cu alloy layer or a Ag alloy layer and a Mo—Zr layer.

16. A liquid crystal display device according to claim 1, wherein the signal line is formed of a sequential laminated body constituted of a TiN layer-Al layer and Ti layer or a TiN layer.

17. A liquid crystal display device according to claim 16, wherein not more than 10 wt % of Nd is alloyed in the Al layer.

18. A liquid crystal display device according to claim 1, wherein the signal line is formed of a sequential laminated body constituted of a Al—Nd layer and a Mo—ZrN layer.

19. A liquid crystal display device according to claim 18, wherein the alloy composition of the Mo—Zr layer is Mo—4 to 20 wt % Zr and the mixing ratio of N is not less than 0.04 element %.

20. A liquid crystal display device according to 1, wherein the signal line is formed of a sequential laminated body constituted of an Al—Nd layer and a Mo—ZrN layer, and a Mo—ZrN layer is formed on a surface of the Mo—ZrN layer exposed from the conductive oxide at the terminal portion.

21. A liquid crystal display device according to claim 20, wherein the alloy composition of the Mo—Zr layer is Mo—4 to 20 wt % Zr and the mixing ratio of N is not less than 0.04 element %.

22. A liquid crystal display device according to claim 1, wherein the signal line is formed of a sequential laminated body constituted of a Cr layer and an alloy layer made of Cr and Mo.

23. A liquid crystal display device comprising:
a plurality of signal lines arranged in parallel;
an insulation film covering the signal lines;
terminal portions having one portions of respective signal lines exposed by forming holes in the insulation film on a liquid-crystal-side surface of one substrate out of a pair of substrates which are arranged to face each other by way of liquid crystal;
wherein each terminal portion is formed such that the terminal portion is disposed close to the terminal portion of the other signal line disposed close to the signal line; and
a conductive oxide film is laminated to each terminal portion, and the conductive oxide film is laminated to at least a periphery of the terminal portion at the neighboring other terminal portion side except for a center portion of the terminal portion.

24. A liquid crystal display device comprising:
a plurality of signal lines arranged in parallel;
an insulation film covering the signal lines;
terminal portions having one portions of respective signal lines exposed by forming holes in the insulation film on a liquid-crystal-side surface of one substrate out of a pair of substrates which are arranged to face each other by way of liquid crystal;
wherein each terminal portion is formed such that the terminal portion is disposed close to the terminal portion of the other signal line disposed close to the signal line; and
the respective terminal portions are comprised of the terminal portions to which conductive oxide films are laminated and the terminal portions to which conductive oxide films are not laminated, and the conductive oxide films are laminated to peripheries except for centers of the terminal portions; and
the conductive oxide films are laminated to other terminal portions disposed close to the terminal portions to which the conductive oxide films are not laminated.

25. A liquid crystal display device comprising:
signal lines;
an insulation film covering the signal lines;
terminal portions having one portions of the signal lines exposed by forming holes in the insulation film;
and conductive oxide films formed on the insulation film such that the oxide films surround the terminal portions are formed on a liquid-crystal-side surface of one substrate out of a pair of substrates which are arranged to face each other by way of liquid crystal layer;
wherein the conductive oxide films are laminated to peripheries except for centers of the terminal portions.

* * * * *